United States Patent
Yamashita

(10) Patent No.: US 7,778,050 B2
(45) Date of Patent: Aug. 17, 2010

(54) ENERGY TRANSFER DEVICE AND ENERGY TRANSFER CONTROL SEMICONDUCTOR DEVICE

(75) Inventor: Tetsuji Yamashita, Kyoto (JP)

(73) Assignee: Panasonic Corporation, Osaka (JP)

( * ) Notice: Subject to any disclaimer, the term of this patent is extended or adjusted under 35 U.S.C. 154(b) by 99 days.

(21) Appl. No.: 12/326,179

(22) Filed: Dec. 2, 2008

(65) Prior Publication Data
US 2009/0147547 A1    Jun. 11, 2009

(30) Foreign Application Priority Data
Dec. 7, 2007    (JP)    ............................. 2007-316474

(51) Int. Cl.
*H02M 3/335*    (2006.01)
(52) U.S. Cl. ................................. 363/21.16; 363/21.18
(58) Field of Classification Search .............. 363/21.12, 363/21.13, 21.14, 21.15, 21.16, 21.17, 21.18
See application file for complete search history.

(56) References Cited
U.S. PATENT DOCUMENTS

| | | | | |
|---|---|---|---|---|
| 6,049,471 | A * | 4/2000 | Korcharz et al. | 363/20 |
| 6,542,387 | B2 | 4/2003 | Tsuge | 363/21.01 |
| 7,116,564 | B2 | 10/2006 | Takahashi | 363/21.16 |
| 7,388,763 | B2 * | 6/2008 | Nakamura | 363/21.15 |
| 7,511,929 | B2 * | 3/2009 | Hachiya | 361/18 |
| 2007/0121258 | A1 | 5/2007 | Hachiya | 361/18 |

FOREIGN PATENT DOCUMENTS

| | | |
|---|---|---|
| JP | 2001-150166 | 6/2001 |
| JP | 2002-354798 | 12/2002 |
| JP | 2005-278305 | 10/2005 |
| JP | 2005-295637 | 10/2005 |

* cited by examiner

*Primary Examiner*—Adolf Berhane
*Assistant Examiner*—Emily Pham
(74) *Attorney, Agent, or Firm*—Steptoe & Johnson LLP

(57) ABSTRACT

The present invention includes a turn-off signal modulating circuit that periodically varies a turn-off timing of a switching element 2 at a preset modulation time after a current detection by a drain current detecting circuit 15, and by modulating the peak of a current flowing through the switching element 2, diffuses switching noise while preventing concentration of an oscillating frequency at a constant frequency even under a constant input voltage and a constant load.

25 Claims, 17 Drawing Sheets

F I G. 6
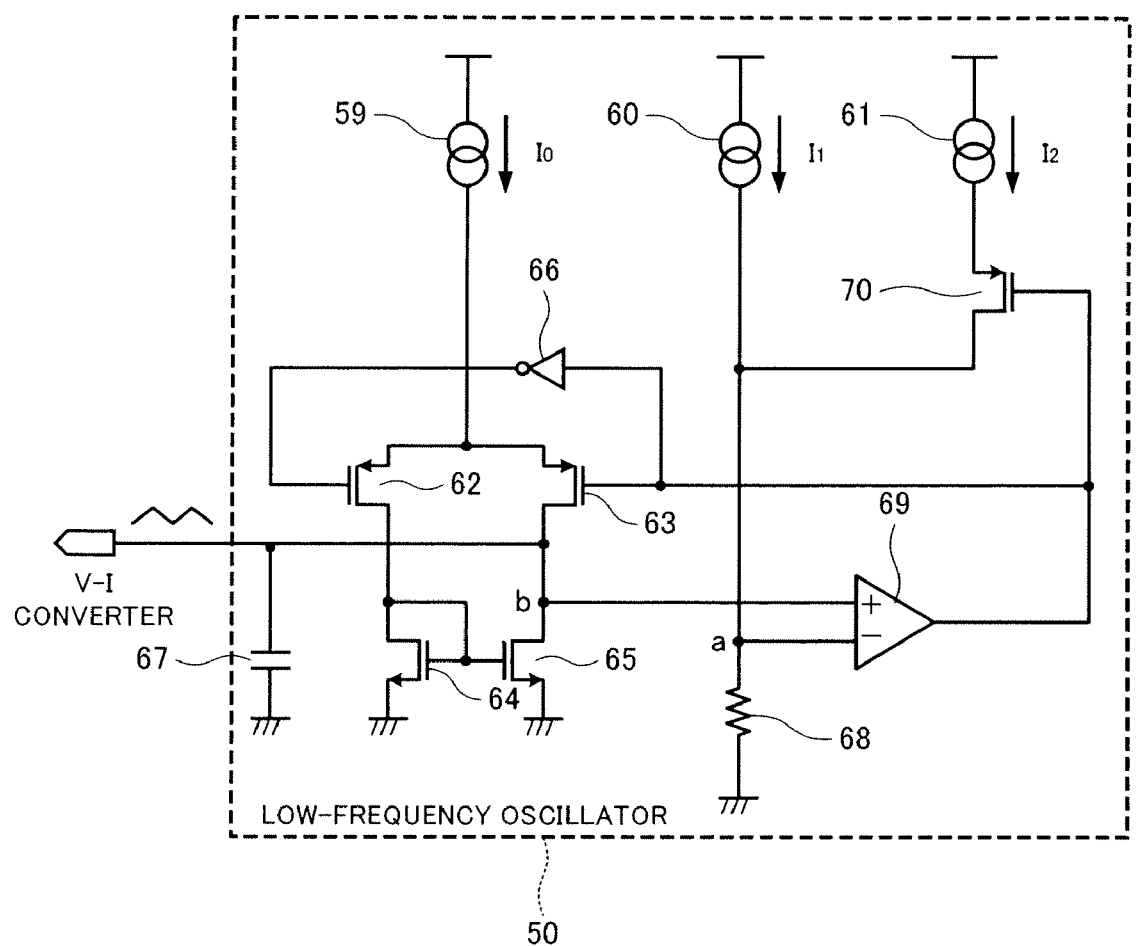

ENERGY TRANSFER DEVICE AND ENERGY TRANSFER CONTROL SEMICONDUCTOR DEVICE

FIELD OF THE INVENTION

The present invention relates to an energy transfer device that controls an output voltage by switching an input voltage through a switching element, and an energy transfer control semiconductor device constituting the energy transfer device.

BACKGROUND OF THE INVENTION

Conventionally, in ordinary household equipment such as home appliances, a switching power supply including a switching power supply control semiconductor device that controls (stabilization or the like) an output voltage through a switching operation by a semiconductor (a switching element such as a transistor) has been widely used as a power supply for the purposes of improving power efficiency by reducing power consumption and the like.

However, the switching power supply generates high levels of switching noise while performing switching operations by turning on/off a switching element, and therefore may potentially have adverse effects on other electronic devices such as malfunction and failure.

In fact, given the need to attain a certain degree of consistency particularly among the standards of different countries in regards to such noise, the international committee CISPR (International Special Committee on Radio Interference) has established and published the EMC (Electromagnetic Compatibility) standard for electronic devices in various fields and automobiles as a "Recommendation".

In order to suppress switching noise generated by such a switching power supply, parts such as a snubber circuit or a noise filter are generally used. However, in many cases, effectively suppressing switching noise is difficult and requires a large number of noise suppression parts. Consequently, power supply costs and area increase, and considerable effort ends up being spent on measures against noise. Particularly, in recent years, there has been an increase in demands for downsizing and cost reduction in power supplies, and a switching power supply capable of meeting noise standards with fewer noise suppression parts is desired.

In order to satisfy demands for reducing switching noise as described above, a conventional switching power unit is disclosed in Japanese Patent Laid-Open No. 2005-295637, a patent laid-open publication of Japan. The disclosed switching power unit varies a control frequency that controls switching operations according to the amplitude of an AC voltage supplied from an AC input power supply by applying a resistance dividing voltage of a DC current obtained by rectifying the AC voltage by a diode bridge to the control terminal of a PWM control IC that controls switching operations of a switching element.

Performing such control causes the control frequency that controls switching operations of a switching element to increase/decrease according to the amplitude of the AC voltage supplied from the AC input power supply. Therefore, a fluctuation occurs in the control frequency which diffuses switching noise while preventing the switching frequency from concentrating at a constant frequency.

Another switching device that reduces switching noise is disclosed in Japanese Patent Laid-Open No. 2002-354798, a patent laid-open publication of Japan. An RCC (ringing choke converter)-type switching power supply disclosed as an example in Japanese Patent Laid-Open No. 2002-354798 includes a switching frequency variable circuit that continuously varies the switching frequency at a specified period within a range from a first switching frequency to a second switching frequency.

The switching frequency variable circuit includes a series circuit constituted by a transistor and a resistor, a reference voltage supply, a comparator, a memory, a control circuit, and a digital/analog converter, and is arranged to vary the frequency within a range from a frequency slightly higher than two thirds a reference switching frequency to a frequency slightly lower than four thirds the reference switching frequency. This configuration reduces switching noise attributable to switching operations of a switching element.

A noise terminal voltage represents a leakage voltage that is outward leakage of the switching frequency of a switching power supply and harmonic components thereof from a commercial AC power supply-side of the switching power supply. Indicators of a noise terminal voltage include the peak value that is a maximum amplitude value of noise, a quasi peak value (Qp value) that depends on an amplitude or an occurrence frequency of noise and which is close to the maximum amplitude value, an average value, and the like. When the switching frequency is constant, these values remain unchanged and are the same.

On the other hand, while the standard value of an average value is set lower than the standard value of a Qp value, if the Qp value and the average value are the same as described above, the Qp value must be lowered to the average value.

The switching power supplies described in Japanese Patent Laid-Open No. 2005-295637 and Japanese Patent Laid-Open No. 2002-354798 cited above reduce the average value of the noise terminal voltage by diffusing switching frequency.

However, since a conventional switching power supply as disclosed in Japanese Patent Laid-Open No. 2005-295637 employs a PWM control method that is a hard switching method, while diffusing the switching frequency reduces the average value of the noise terminal voltage, the Qp value remains high. Therefore, reliable noise suppression parts for reducing the Qp value become necessary.

In addition, since a conventional switching power supply as disclosed in Japanese Patent Laid-Open No. 2002-354798 employs an RCC method that is a soft switching method, a reduction in switching noise can be achieved with fewer noise suppression parts as compared to Japanese Patent Laid-Open No. 2005-295637. However, the switching frequency variable circuit for diffusing frequency requires more parts, resulting in an increase in power supply cost even though the effort spent on measures against switching noise is reduced.

Meanwhile, with a general RCC-type switching power supply, a switching frequency f can be expressed by the following formula.

[Formula 1]

$$f = \frac{(V_i - V_{ds})^2}{8L_P V_o I_o} \quad (1)$$

where
  $V_i$: input voltage to transformer,
  $V_{ds}$: drain-source voltage of switching element,
  $L_p$: primary side inductance of transformer,
  $V_o$: output voltage, and
  $I_o$: output load current.
From Formula (1) presented above, the following is true.

When the input voltage is constant, the lighter the load, i.e., the smaller the output load current $I_o$, the higher the oscillating frequency f of the switching element.

When the output load current $I_o$ is constant, the higher the input voltage Vi, the higher the oscillating frequency f.

In addition, an input ripple voltage $Vi_{(rip)}$ is determined by the capacity of an input electrolytic capacitor and can be expressed by the following formula.

[Formula 2]

$$Vi_{(rip)} = \sqrt{2} \times Vi_{(AC)} - \sqrt{(2 \times Vi_{(AC)}^2) - \frac{2 \times P_o \times \left(\frac{1}{2 \times f_L} - t_C\right)}{\eta \times C_{IN}}} \quad (2)$$

where
- $Vi_{(AC)}$: input AC voltage to transformer,
- $P_o$: output power,
- $f_L$: commercial frequency,
- $t_C$: bridge diode conduction time,
- $\eta$: power supply efficiency, and
- $C_{IN}$: input electrolytic capacitor capacity.

In a specification of a worldwide AC input power supply, $C_{IN}$ is constant. Therefore, in Formula (2), assuming that variables other than the input voltage $Vi_{(AC)}$ are constant, it is found that the higher the input, the smaller the input ripple voltage $Vi_{(rip)}$. For example, if $P_0=60[W]$, $f_L=50$ [Hz], $t_C=2$ [ms], $\eta=0.8$, and $C_{IN}=150$ [μF], when $Vi_{(AC)}=100$ [V], $Vi_{(rip)}=31.9$ [V] However, when $Vi_{(AC)}=240$ [V], $Vi_{(rip)}=12$ [V].

With an RCC-type switching power supply, according to Formula (1), since the oscillating frequency f varies with input voltage Vi, input ripple voltage is high during low input. As a result, the variation in oscillating frequency increases, causing diffusion of oscillating frequency over a wide range. However, input ripple voltage during high input is low and the variation in oscillating frequency is significantly small.

As described above, in the case of the RCC method, oscillating frequency requisitely diffuses due to input ripple voltage and achieves an effect of reducing the noise average value. However, during high input, since the diffusion of oscillating frequency due to input ripple voltage is small, the noise average value tends to deteriorate.

While the input electrolytic capacitor capacity can conceivably be reduced during high input, in order to ensure that the oscillating frequency diffuses, the reduction in the input electrolytic capacitor capacity disadvantageously increases input ripple voltage during low input significantly, which in turn shortens the life cycle of the input electrolytic capacitor.

Furthermore, in the case of DC input instead of AC input, a diffusion of the oscillating frequency due to input ripple voltage as described above does not occur. Therefore, if the output load is constant, the oscillating frequency of the switching element becomes fixed and the noise average value becomes equal to the Qp value, thereby necessitating adequate measures against noise.

DISCLOSURE OF THE INVENTION

The present invention is made to solve the conventional problems described above, and an object thereof is to provide an energy transfer device and an energy transfer control semiconductor device capable of reducing switching noise associated with a switching operation using a simple and small component configuration in an RCC-type switching power supply including pseudo-resonance control and the like, limiting cost increase, and particularly during high voltage input under a W/W (worldwide) AC input specification or voltage input under a DC input specification, effectively reducing an average value of a noise terminal voltage that leaks outward from a commercial power supply that supplies such input voltage.

In order to solve the problems described above, an energy transfer device according to the present invention includes: a transformer having a primary winding, a secondary winding, and an auxiliary winding; a switching element series-connected to the primary winding; a control circuit that controls a switching operation of the switching element to perform switching control on a first DC voltage to be inputted to the switching element via the primary winding; an output voltage generating unit that converts an AC voltage generated on the secondary winding by the switching control into a second DC voltage and supplies power to a load; and an output voltage detecting circuit that detects a variation in the second DC voltage and transfers a feedback signal for the switching control generated in accordance with the variation to the control circuit, wherein the control circuit includes: a feedback signal control circuit that determines a level of a current flowing through the switching element based on the feedback signal from the output voltage detecting circuit; a switching element current detecting circuit that generates a signal that turns off the switching element when the current flowing through the switching element reaches the level value determined by the feedback signal control circuit; a turn-on detecting circuit that detects, from the voltage of the auxiliary winding, a state of a ringing voltage generated after a secondary current flowing through the secondary winding ceases to flow after the switching element is turned off, and generates a signal for turning on the switching element; and a current peak modulator that performs modulation so that the peak of the current flowing through the switching element periodically and continuously varies within a current range from a first current value to a second current value.

Furthermore, a turn-off signal modulating circuit that performs modulation so that a turn-off signal of the switching element by the switching element current detecting circuit periodically and continuously varies within a time range from a first delay time to a second delay time is provided as the current peak modulator to the control circuit, and time modulation is performed by the turn-off signal modulating circuit in order to vary a turn-off timing of the switching element and modulate the current peak.

Furthermore, the turn-off signal modulating circuit includes a low-frequency oscillator that outputs a triangular wave voltage and a V-I converter that converts the triangular wave voltage from the low-frequency oscillator into a current, the time modulation is determined depending on the magnitude of an output current of the V-I converter, and a modulation time of the turn-off signal is set based on the amplitude of the triangular wave voltage to the time range from the first delay time to the second delay time while a modulation period is determined depending on a switchover period of the triangular wave voltage.

Furthermore, the turn-off signal modulating circuit automatically varies the modulation duration and the modulation period of the turn-off signal according to an output signal from the feedback signal control circuit based on a feedback signal from the output voltage detecting circuit.

Furthermore, the turn-off signal modulating circuit increases the modulation duration and shortens the modulation period as a load condition of the second DC current becomes a lighter load condition according to an output signal from the feedback signal control circuit based on a feedback signal that varies depending on the load condition of the second DC voltage.

Furthermore, an input voltage detecting circuit that detects the first DC voltage is provided to the control circuit, and the turn-off signal modulating circuit automatically varies the modulation duration and the modulation period of the turn-off signal according to an output signal from the input voltage detecting circuit.

Furthermore, the turn-off signal modulating circuit increases the modulation duration and shortens the modulation period as the first DC voltage increases according to an output signal from the input voltage detecting circuit which varies depending on the first DC voltage.

Furthermore, the turn-off signal modulating circuit causes an operation for automatically varying the modulation duration and the modulation period to be performed when the first DC voltage equals or exceeds a preset constant voltage.

Furthermore, a number-of-oscillations counting circuit that counts the number of oscillations due to the switching operation of the switching element is provided to the control circuit, and the turn-off signal modulating circuit automatically varies the modulation duration and the modulation period of the turn-off signal according to an output signal from the number-of-oscillations counting circuit.

Furthermore, the number-of-oscillations counting circuit includes a number-of-oscillations counter that inputs a control electrode signal of the switching element and outputs a high level at a timing where the number of switching operations of the switching element reaches a preset count and a D flip-flop that switches an output signal between a low level and a high level at the timing when the preset count is reached, and the turn-off signal modulating circuit automatically varies the modulation duration and the modulation period according to an output signal from the D flip-flop.

Furthermore, the turn-off signal modulating circuit increases the modulation duration and shortens the modulation period as the number-of-oscillations count time quickens according to an output signal from the D flip-flop which is outputted at the timing when the preset count is reached.

Furthermore, a feedback signal modulating circuit that modulates an output signal from the feedback signal control circuit which determines the level of a current flowing through the switching element is provided as the current peak modulator to the control circuit, and the feedback signal control circuit modulates the peak of a current flowing through the switching element so as to periodically and continuously vary within the current range from the first current value to the second current value according to an output signal modulated by the feedback signal modulating circuit.

Furthermore, the feedback signal control circuit includes an I-V converter that converts a feedback current into a voltage as a feedback signal from the output voltage detecting circuit, and a reference voltage of the I-V converter is periodically and continuously varied within a voltage range from a first voltage value to a second voltage value according to an output voltage from the feedback signal modulating circuit in order to modulate the peak of a current flowing through the switching element so as to periodically and continuously vary within the current range from the first current value to the second current value.

Furthermore, the feedback signal modulating circuit includes a low-frequency oscillator that outputs a triangular wave, and the feedback signal control circuit determines the voltage range from the first voltage value to the second voltage value according to the amplitude of a triangular wave voltage from the low-frequency oscillator as the reference voltage of the I-V converter and determines a modulation period according to a switchover period of the triangular wave.

Furthermore, the feedback signal control circuit modulates the peak of a current flowing through the switching element so as to periodically and continuously vary within the current range from the first current value to the second current value by periodically and continuously varying an output voltage from the I-V converter within the voltage range from the first voltage value to the second voltage value using the reference voltage of the I-V converter having the voltage range from the first voltage value to the second voltage value determined according to the amplitude of the triangular wave voltage from the low-frequency oscillator and the modulation period.

Furthermore, the feedback signal modulating circuit includes a low-frequency oscillator that outputs a triangular wave and a V-I converter that converts a triangular wave voltage from the low-frequency oscillator into a current, the feedback signal control circuit includes an I-V converter that converts a feedback current into a voltage as a feedback signal from the output voltage detecting circuit, and the energy transfer device determines, via the V-I converter, a current range from a first current value to a second current value according to the amplitude of a triangular wave voltage from the low-frequency oscillator as an input current to the I-V converter, determines a modulation period in accordance with a switchover period of the triangular wave voltage, and by periodically and continuously varying the input current to the I-V converter within a current range from a first current value to a second current value according to an output current from the V-I converter, modulates the peak of a current flowing through the switching element so as to periodically and continuously vary within the current range from the first current value to the second current value.

Furthermore, the feedback signal control circuit automatically varies the modulation duration and the modulation period of a turn-off signal with respect to the peak of a current flowing through the switching element by controlling a feedback signal from the output voltage detecting circuit using an output signal from the feedback signal modulating circuit.

Furthermore, the feedback signal modulating circuit automatically varies the modulation duration and the modulation period with respect to an output signal to the feedback signal control circuit depending on a load condition of the second DC voltage to increase the modulation duration and shorten the modulation period as the load condition becomes a lighter load condition.

Furthermore, an input voltage detecting circuit that detects the magnitude of the first DC voltage is provided to the control circuit, the feedback signal control circuit automatically varies the modulation duration and the modulation period of a turn-off signal with respect to the peak of a current flowing through the switching element by controlling a feedback signal from the output voltage detecting circuit using an output signal from the feedback signal modulating circuit, and the feedback signal modulating circuit automatically varies the modulation duration and the modulation period of the output signal to the feedback signal control circuit depending on an output signal from the input voltage detecting circuit.

Furthermore, the feedback signal modulating circuit automatically varies the modulation duration and the modulation period of an output signal to the feedback signal control circuit depending on the magnitude of the first DC voltage to increase the modulation duration and shorten the modulation period as the first DC voltage increases.

Furthermore, the feedback signal modulating circuit automatically varies the modulation duration and the modulation period of an output signal to the feedback signal control circuit depending on the magnitude of the first DC voltage to perform an operation for automatically varying the modulation duration and the modulation period when the first DC voltage equals or exceeds a preset constant voltage.

Furthermore, a number-of-oscillations counting circuit that counts the number of oscillations due to the switching operation of the switching element is provided to the control circuit, the feedback signal control circuit automatically varies the modulation duration and the modulation period of a turn-off signal with respect to the peak of a current flowing through the switching element by controlling a feedback signal from the output voltage detecting circuit using an output signal from the feedback signal modulating circuit, and the feedback signal modulating circuit automatically varies the modulation duration and the modulation period of the output signal to the feedback signal control circuit depending on an output signal from the number-of-oscillations counting circuit.

Furthermore, the number-of-oscillations counting circuit includes a number-of-oscillations counter that counts the number of oscillations of the switching element based on a control electrode signal of the switching element and outputs a high level at a timing when the number of oscillations of the switching element reaches a preset count and a D flip-flop that switches an output signal between a low level and a high level at a timing when the output of the number-of-oscillations counter reaches a high level, and the feedback signal modulating circuit automatically varies the modulation duration and the modulation period of an output signal to the feedback signal control circuit depending on an output signal of the D flip-flop.

Furthermore, the feedback signal modulating circuit automatically varies the modulation duration and the modulation period of an output signal to the feedback signal control circuit depending on a switchover time between a low level and a high level of an output signal from the D flip-flop, and increases the modulation duration and shortens the modulation period as the switchover time between the low level and the high level of the output signal from the D flip-flop quickens.

In an energy transfer control semiconductor device according to the present invention, the switching element and the control circuit are formed as an integrated circuit on the same semiconductor substrate in the energy transfer device described above.

As described above, according to the present invention, by modulating the peak value of a current flowing through a switching element so as to periodically and continuously vary within a current range from a first current value to a second current value, frequency components of switching noise can be diffused while preventing concentration of an oscillating frequency of the switching element at a constant frequency even under a constant input voltage and a constant load condition.

In addition, during modulation performed on the peak value of a current flowing through the switching element, by varying a current range from a first current value to a second current value due to the modulation in accordance with output load power, the proportion of modulation with respect to the oscillating frequency of the switching element can be kept constant across a wide load region.

Furthermore, during modulation performed on the peak value of a current flowing through the switching element, by varying a current range from a first current value to a second current value due to the modulation in accordance with input voltage, the proportion of modulation with respect to the oscillating frequency of the switching element can be kept constant across a wide input voltage region.

Moreover, during modulation performed on the peak value of a current flowing through the switching element, by varying a current range from a first current value to a second current value due to the modulation in accordance with the number of oscillations of the switching element, the proportion of modulation with respect to the oscillating frequency of the switching element can be kept constant across a wide input voltage/load region.

Accordingly, an average value of a noise terminal voltage when a frequency of switching noise associated with a switching operation and harmonic components thereof leak outward from a commercial power supply can be readily and significantly reduced using a simple and small component configuration, thereby achieving downsizing and cost reduction of a device.

BRIEF DESCRIPTION OF THE DRAWINGS

FIG. 6 is a circuit diagram showing a configuration example of a low-frequency oscillator inside the turn-off signal modulating circuit in the energy transfer control semiconductor device according to the first embodiment of the present invention;

DESCRIPTION OF THE EMBODIMENTS

Energy transfer devices and energy transfer control semiconductor devices representing embodiments of the present invention will now be described in detail with reference to the drawings.

First Embodiment

An energy transfer device according to a first embodiment of the present invention will be described.

Figure 1:
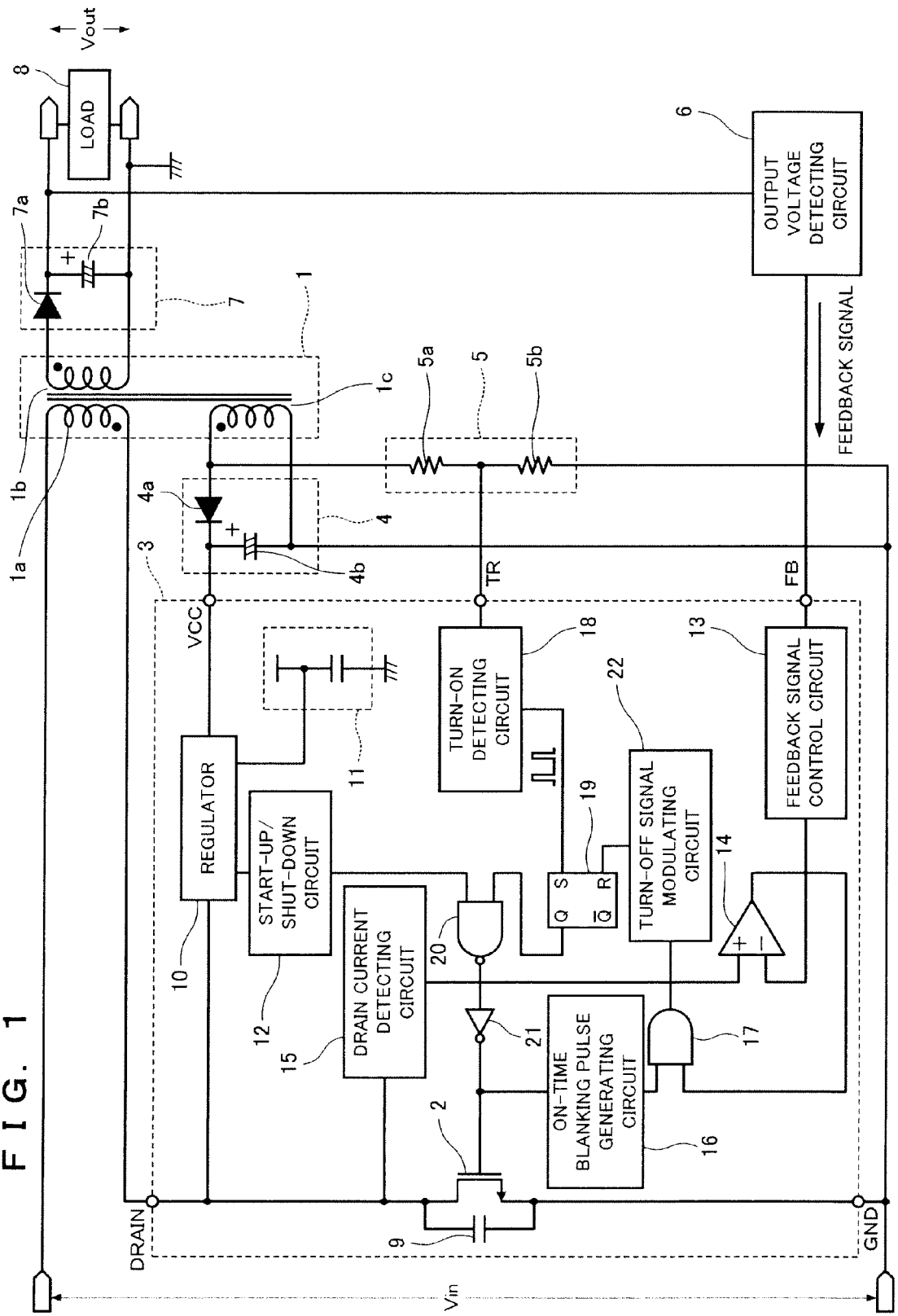
FIG. 1 is a circuit diagram showing a configuration example of an energy transfer device including an energy transfer control semiconductor device according to a first embodiment of the present invention.

FIG. 1 is a circuit diagram showing a configuration example of the energy transfer device including an energy transfer control semiconductor device according to the present first embodiment.

In FIG. 1, a transformer 1 includes a primary winding 1a, a secondary winding 1b, and an auxiliary winding 1c. The primary winding 1a and the secondary winding 1b have reverse polarities. This energy transfer device, i.e., a switching power supply, is of a flyback type.

A switching element 2 is connected to the primary winding 1a. On/off switching control of a control electrode (gate) of the switching element 2 is performed by an output signal of a control circuit 3.

The control circuit 3 that is a semiconductor device includes the switching element 2, whereby the switching element 2 constituted by a power MOSFET or the like is integrated on the same semiconductor substrate. In addition, as external input/output terminals, the control circuit 3 includes five terminals, namely, a DRAIN terminal, a GND terminal, a VCC terminal, an FB terminal, and a TR terminal.

The DRAIN terminal is a terminal connected to the connecting point of the primary winding 1a of the transformer 1 and the switching element 2 or, in other words, a drain of the switching element 2.

The GND terminal is a terminal connecting a source of the switching element 2 and a GND of the control circuit 3 to a ground (earth) level, and is connected to a low potential-side terminal among two terminals to which an input DC voltage Vin is applied.

The VCC terminal is a terminal connecting an output of a rectifying smoothing circuit 4 constituted by a rectifying diode 4a and a smoothing capacitor 4b with a regulator 10 built into the control circuit 3. The VCC terminal rectifies and smoothes an AC voltage generated at the auxiliary winding 1c by a switching operation of the switching element 2, and inputs the rectified and smoothed AC voltage as an auxiliary power supply voltage VCC to the control circuit 3.

The FB terminal is a terminal for inputting a feedback signal (for example, a current of a photo transistor) outputted from an output voltage detecting circuit 6 into a feedback signal control circuit 13 of the control circuit 3.

The TR terminal is a terminal for detecting a ringing voltage that is generated after a secondary current flowing through the secondary winding 1b of the transformer 1 ceases to flow subsequent to the switching element 2 being turned off and inputting the ringing voltage to a turn-on detecting circuit 18 that generates a pulse for turning on the switching element 2. An auxiliary winding voltage dividing circuit 5 constituted by resistors 5a and 5b divides a voltage induced at the auxiliary winding 1c of the transformer 1 by a switching operation of the switching element 2 and inputs the divided voltage to the TR terminal. The auxiliary winding voltage dividing circuit 5 is provided in order to suppress input voltage to the TR terminal.

The auxiliary winding voltage dividing circuit 5 also functions to impose a current limitation when the voltage of the auxiliary winding 1c swings over to the negative due to the resistor 5a in order to prevent a latch-up of the control circuit 3. A pulse output signal of the turn-on detecting circuit 18 is inputted to a set (S) of an RS flip-flop 19. In other words, due to the set signal, an output (Q) of the RS flip-flop reaches an H-level, whereby the H-level is inputted to one of the gates of a NAND circuit 20.

The regulator 10 is connected between the DRAIN terminal and the VCC terminal of the switching element 2, a start-up/shut-down circuit 12, and an internal circuit voltage supply 11 of the control circuit 3. When an input DC voltage Vin is applied to the DRAIN terminal of the switching element 2 via the transformer 1, the regulator 10 supplies a current to the capacitor 4b of the rectifying smoothing circuit 4 that outputs an auxiliary power supply voltage VCC from the DRAIN terminal via the VCC terminal, and causes the auxiliary power supply voltage VCC to rise.

When the VCC terminal voltage reaches a start-up voltage, the current supply from the DRAIN terminal to the VCC terminal is cut off and the current supply to internal circuits is performed by the capacitor 4b of the rectifying smoothing circuit 4 that outputs the auxiliary power supply voltage VCC. When the VCC terminal voltage drops to a shut-down voltage, in the same manner as pre start-up, current supply is performed from the DRAIN terminal to the VCC terminal and the VCC terminal voltage rises once again. The internal circuit voltage supply 11 is controlled by the regulator 10 so as to maintain a constant voltage.

The start-up/shut-down circuit 12 monitors the VCC terminal voltage, and controls oscillation and suspension of the switching element 2 depending on the magnitude of the VCC terminal voltage. When the VCC terminal voltage reaches the start-up voltage, the start-up/shut-down circuit 12 outputs an H-level to one of the gates of the NAND circuit 20, and when the VCC terminal voltage drops to the shut-down voltage, the start-up/shut-down circuit 12 outputs an L-level.

Depending on a feedback signal to be outputted from the output voltage detecting circuit 6 and inputted to the FB terminal of the control circuit 3, the feedback signal control circuit 13 determines a level of a current flowing through the switching element 2 so as to stabilize an output DC voltage Vout to be constant, and outputs the current level as a voltage signal to a negative (−) side of a comparator 14. An output voltage from the feedback signal control circuit 13 is controlled so as to reduce the current flowing through the switching element 2 when load is light and the output voltage Vout rises and to cause the current flowing through the switching element 2 to rise when load is heavy and the output voltage Vout drops.

Figure 2:
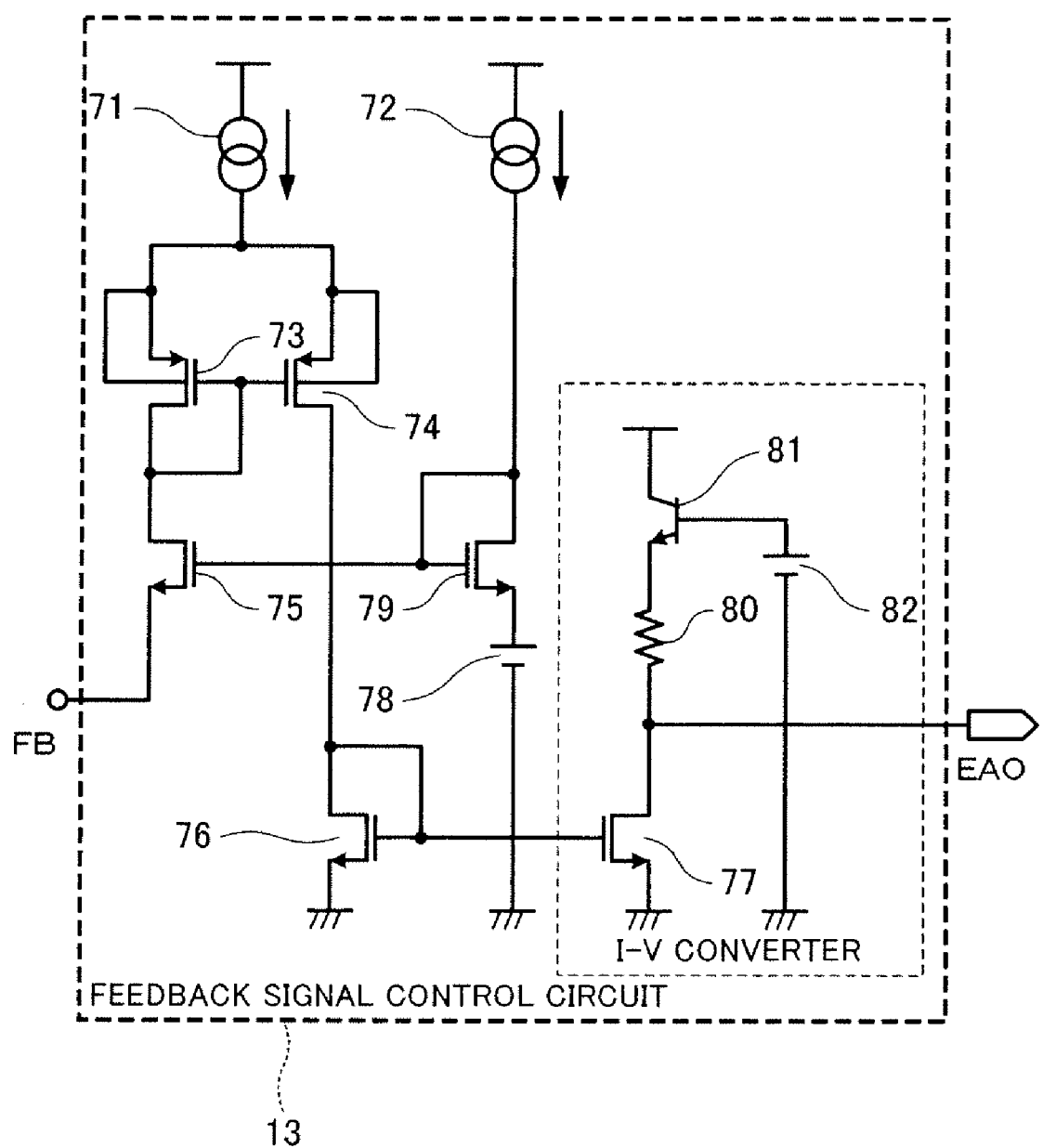
FIG. 2 is a circuit diagram showing a configuration example of a feedback signal control circuit in the energy transfer control semiconductor device according to the first embodiment of the present invention.

An example of a specific circuit configuration of the feedback signal control circuit 13 will now be shown in FIG. 2. Reference numerals 71 and 72 denote constant current supplies, 73 and 74 P-type MOSFETs, 75, 76, 77 and 79 N-type MOSFETs, 78 and 82 constant voltage supplies, 80 a resistor, and 81 an NPN bipolar transistor. Reference numerals 77, 80, 81 and 82 constitute an I-V converter. In addition, reference numerals 73 and 74, and 76 and 77 respectively constitute mirror circuits.

The constant current supplies 71 and 72 are provided to impose a current limitation in the event that the FB terminal short-circuits with GND. The voltage of an output EAO voltage-converted by the I-V converter is determined by a current flowing through the resistor 80 and varies according to Formula (3) below.

[Formula 3]

$$VEAO = VR - Vbe - (R \times I) \quad (3)$$

where

VEAO: output voltage of I-V converter,
VR: constant voltage value of constant voltage supply 82,
Vbe: B-E voltage of NPN bipolar transistor,
R: resistance value of resistor 80, and
I: current of resistor R.

As is apparent from the formula, the greater the current I flowing through the resistor R, the lower the converted voltage VEAO. In other words, the greater the current flowing out from the FB terminal, the lower the converted voltage VEAO, and in association therewith, the lower the current flowing through the switching element 2. In addition, VEAO rises as the current flowing out from the FB terminal decreases, and in association therewith, the current flowing through the switching element 2 increases.

Figure 3:
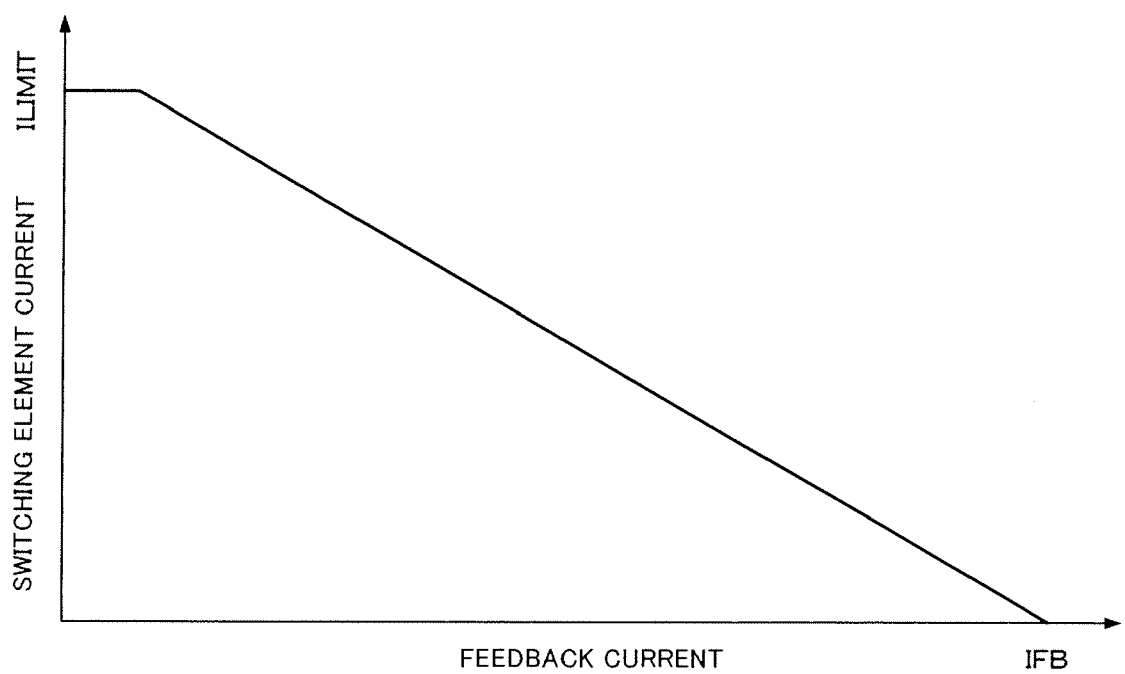
FIG. 3 is a schematic diagram showing a current flowing through a switching element with respect to a feedback current in the energy transfer device including the energy transfer control semiconductor device according to the first embodiment of the present invention.

A current flowing through the switching element 2 is controlled as described above by a feedback signal from the output voltage detecting circuit 6 or, in other words, a current flowing out of the FB terminal. FIG. 3 represents a relationship between the resistor R or, in other words, an FB terminal current (IFB) and a current (ILIMIT) flowing through the switching element 2.

A drain current detecting circuit 15 that is a switching element current detecting circuit detects, for example, an ON voltage that is determined as a product of a drain current flowing through the switching element 2 and an ON resistance of the switching element 2 in order to detect a drain current that relatively flows through the switching element 2, and outputs a voltage signal that is proportional to the magnitude of the drain current to a positive (+) side of the comparator 14. When an output signal of the drain current detecting circuit 15 becomes equal to an output signal of the feedback signal control circuit 13, the comparator 14 outputs an H-level signal to one of the gates of an AND circuit 17.

An ON-time blanking pulse generating circuit 16 sets a constant blanking time after a turn-on signal is outputted by a gate driver (inverter circuit) 21 to the switching element 2 in order to prevent a capacitive spike current or the like due to the capacity of the switching element itself from being erroneously detected.

After blanking is released, an H-level signal is outputted from the ON-time blanking pulse generating circuit 16 to one of the gates of the AND circuit 17. In addition, when the switching element 2 is turned on, an input signal of the AND circuit 17 reaches an H-level both after a set blanking time by the ON-time blanking pulse generating circuit 16 elapses and after a current determined by the feedback signal control circuit 13 flows through the switching element 2. Consequently, an output signal from the AND circuit reaches an H-level.

A turn-off signal modulating circuit 22 is a circuit that accepts an H-level output signal from the AND circuit 17 and, after a constant delay time, transfers the H-level signal to a reset (R) of the RS flip-flop 19. A detailed description on the turn-off signal modulating circuit 22 including a circuit configuration example will be made in a description of operations to be given later.

Once a start-up state is entered, since an output signal from the start-up/shut-down circuit 12 reaches an H-level, one of the gates of the NAND circuit 20 is at an H-level. In addition, since an H-level pulse signal is inputted to the set (S) of the RS flip-flop 19 after a turn-on is detected by the turn-on detecting circuit 18, the output (Q) reaches an H-level and the other input signal to the NAND circuit 20 also reaches an H-level. At this point, since the output signal of the NAND circuit 20 falls to an L-level, an output signal of an inverter circuit 21 reaches an H-level and the switching element 2 transitions to a turn-on state.

On the other hand, after the switching element 2 is turned on and subsequent to an ON-time blanking time, when the feedback signal control circuit 13 causes a current in accordance with a feedback signal from the output voltage detecting circuit 6 to flow into the switching element 2, the H-level signal from the AND circuit 17 is inputted to the reset (R) of the RS flip-flop 19 via the turn-off signal modulating circuit 22. Therefore, since the output (Q) switches over to an L-level and one of the inputs of the NAND circuit 20 falls to an L-level, the output signal of the inverter circuit 21 falls to an L-level and the switching element 2 changes to a turn-off state.

Switching operations of the switching element 2 are performed according to the signal processing described above.

An output voltage generator 7 constituted by a rectifying diode 7a and a capacitor 7b is connected to the secondary winding 1b. An AC voltage induced in the secondary winding 1b by a switching operation of the switching element 2 is rectified and smoothed by the output voltage generator 7 to generate an output DC voltage Vout, which is then supplied and applied to a load 8.

In addition, the output voltage detecting circuit 6 is constituted by, for example, an LED, a zener diode, and the like, detects a voltage level of the output DC voltage Vout, and outputs a feedback signal necessary for the control circuit 3 to control a switching operation of the switching element 2 so that the output DC voltage Vout stabilizes at a prescribed voltage.

In the present switching power supply, a commercial AC power supply is rectified by a rectifier such as a diode bridge and smoothed by an input capacitor to become an DC voltage Vin, which is then applied to the primary winding 1a of the power-converting transformer 1. Furthermore, a resonant capacitor 9 connected between the DRAIN terminal and the source terminal of the switching element 2 is provided for determining a magnitude and a period of ringing due to resonance with the transformer 1.

Operations of the energy transfer control semiconductor device 3 and the energy transfer device shown in FIG. 1 and configured as described above will now be described.

When an AC current from a commercial power supply is inputted to a rectifier such as a diode bridge, the AC current is rectified and smoothed by the rectifier and an input capacitor and converted into a DC voltage Vin. The DC input voltage Vin is applied to the DRAIN terminal via the primary winding 1a of the transformer 1, and a start-up charging current flows from the DRAIN terminal via the regulator 10 in the control circuit 3 to the capacitor 4b connected to the VCC terminal. When the charging current causes the VCC terminal voltage of the control circuit 3 to reach a start-up voltage set by the start-up/shut-down circuit 12, control of a switching operation performed by the switching element 2 commences.

Upon start-up, although not explicitly shown in FIG. 1, a start-up pulse is generated based on an output signal from the start-up/shut-down circuit 12 and the switching element 2 is turned on. In addition, at this point, since a secondary-side output voltage Vout is low upon start-up, a feedback signal from the output voltage detecting circuit 6 is not inputted to the feedback signal control circuit 13. Therefore, it may be assumed that a converted voltage VEAO of the I-V converter inside the feedback signal control circuit 13 is set high and a negative-side voltage of the comparator 14 is set high.

Once the switching element 2 is turned on, a current flows through the switching element 2 and a voltage in accordance with the magnitude of the current flowing through the switching element 2 is inputted to the positive-side of the comparator 14. After a blanking time by the ON-time blanking pulse generating circuit 16, when an output signal from the drain current detecting circuit 15 rises so as to equal or exceed a voltage determined by the negative-side of the comparator 14, since the signals inputted to the AND circuit 17 are both H-level signals, an H-level signal is outputted from the AND circuit 17 to the turn-off signal modulating circuit 22. The turn-off signal modulating circuit 22 receives the signal, and after a constant delay time, outputs an H signal to the reset (R) of the RS flip-flop 19 and the switching element 2 is turned off.

When the switching element 2 is turned off, the energy stored in the primary winding 1a of the transformer 1 during the on-period of the switching element 2 is transferred to the secondary winding 1b. Subsequently, when a secondary current flowing through the secondary winding 1b ceases to flow, a resonance operation determined by an inductance L according to the primary winding 1a of the transformer 1 and a capacitance value of the resonant capacitor 9 connected between the DRAIN terminal and the source terminal of the switching element 2 is commenced.

At this point, the turn-on detecting circuit 18 detects a voltage drop of the DRAIN terminal of the switching element 2 or, in other words, a timing when a voltage of the auxiliary winding 1c of the transformer 1 switches from positive to negative, an H-level pulse signal is outputted to the set (S) of the RS flip-flop 19, and the switching element 2 is once again turned on.

Alternatively, a capacitor or the like may be connected to the TR terminal and the turn-on timing by the turn-on detecting circuit 18 may be adjusted to turn on the switching element 2 at a point where the DRAIN terminal becomes approximately zero volts.

The output voltage Vout rises as the switching operation described above is repeated. When the output voltage Vout equals or exceeds a voltage set by the output voltage detecting circuit 6, the output voltage detecting circuit 6 performs control so that a current flows out as a feedback signal from the FB terminal of the control circuit 3. Since the conversion output voltage VEAO according to the I-V converter inside the feedback signal control circuit 13 drops depending on the magnitude of the outflow current, the negative-side of the comparator 14 declines and, as a result, the current flowing through the switching element 2 decreases.

In this manner, the on-duty of the switching element 2 transitions to an appropriate condition. That is, a turn-on of the switching element 2 is performed by an output pulse signal from the turn-on detecting circuit 18, while a turn-off is performed when the current flowing through the switching element 2 reaches a current level determined by the amount of a current flowing out from the FB terminal.

In other words, in a light-load condition where current supply to the load 8 is light, a period during which the current flows through the switching element 2 is shortened. In a heavy-load condition, the period during which the current flows through the switching element 2 is extended.

As described above, the control circuit 3 performs control depending on the power supplied to the load 8 of the switching power supply such as controlling the current flowing through the switching element 2 and changing on-duty. Since switching loss upon turn-on can be suppressed by setting the turn-on timing of the switching element 2 to be outputted when DRAIN terminal voltage in a resonance operation is at the lowest level, the switching loss upon turn-on can be suppressed and higher efficiency and lower noise can be achieved.

Details of the turn-off signal modulating circuit 22 will now be described based on FIG. 4 that is a circuit diagram showing a configuration example of the turn-off signal modulating circuit 22.

An output signal from the AND circuit 17 shown in FIG. 1 is inputted to a current detecting terminal which is connected via an inverter circuit 55 to a gate of an inverter circuit constituted by a P-type MOSFET 56 and an N-type MOSFET 57. In addition, an output of the inverter circuit is connected to a high-potential side of a capacitor 58, and outputted from a FF terminal via inverter circuits 430 and 431 to the reset (R) of the RS flip-flop 19 shown in FIG. 1.

Meanwhile, a drain of a P-type MOSFET 54 is connected to a source side of the P-type MOSFET 56, and a current converted from a triangular wave voltage that is an output from a low-frequency oscillator 50 by a V-I converter constituted by an NPN bipolar transistor 51, a resistor 52, and P-type MOSFETs 53 and 54 is arranged to flow into the capacitor 58 when the P-type MOSFET 56 is turned on. The P-type MOSFETs 53 and 54 constitute mirror circuits.

For example, assuming that a mirror ratio between the mirror circuits 53 and 54 is 1, if Vf(t) denotes an output voltage from the low-frequency oscillator 50, $R_0$ a resistance value of the resistor 52, and $Vbe_0$ the Vbe of the NPN bipolar transistor 51, then a current If(t) flowing from the P-type MOSFET 54 to the capacitor 58 when the P-type MOSFET 56 is ON may be expressed by the following formula.

[Formula 4]

$$If(t) = \frac{Vf(t) - Vbe_0}{R_0} \quad (4)$$

In the formula, since Vf(t) periodically and continuously varies within a voltage range from a first voltage value to a second voltage value, If(t) periodically and continuously varies within a current range from a first current value to a second current value.

At the turn-off signal modulating circuit 22 configured as described above, when an L-level signal has been inputted from the AND circuit 17 to the current detecting terminal, a signal of the output terminal FF falls to an L-level. However, after detection of a current of the switching element 2, when an H-level signal is inputted from the AND circuit 17 to the current detecting terminal, an L-level signal is inputted to a gate of the P-type MOSFET 56 via the inverter circuit 55 and the P-type MOSFET 56 enters an ON state.

At this point, a current If(t) determined by an output triangular wave voltage from the low-frequency oscillator 50 is generated by the V-I converter and charges the capacitor 58 via the P-type MOSFET 56. While the potential of the capacitor 58 rises due to the charge current If(t), once a threshold voltage of the inverter circuit is exceeded, an output of the inverter circuit 430 switches over to an L-level and a signal of the output terminal FF via the inverter circuit 431 reaches an H-level.

Now, if Vt denotes a threshold voltage of the inverter circuit 430 and C a capacitance value of the capacitor 58, then a time from when the P-type MOSFET 56 enters an ON state to when the output of the inverter circuit 430 switches from an H-level to an L-level or, in other words, a delay time tf(t) from when an H-level signal is inputted to the current detecting terminal to when the output signal FF reaches an H-level may be expressed by

[Formula 5]

$$tf(t) = \frac{C \times Vt}{If(t)}. \quad (5)$$

As described above, since the output triangular wave voltage Vf(t) outputted from the low-frequency oscillator 50 operates so as to periodically and continuously vary within a voltage range from a first voltage value to a second voltage value, If(t) periodically and continuously varies within a current range from a first current value to a second current value.

Therefore, from Formula (5) described above, the delay time tf(t) of the signal periodically and continuously varies within a time range from a first delay time to a second delay time. In other words, the H-level signal outputted from the AND circuit 17 is inputted after the delay time tf(t) to the reset (R) of the RS flip-flop 19 via the turn-off signal modulating circuit 22 and, as a result, turns off the switching element 2.

The above description shows that the switching element 2 is not immediately turned off after a current of the switching element 2 is detected, and that the switching element 2 is actually turned off after a delay time tf(t) determined by the turn-off signal modulating circuit 22. In other words, a current actually flows through the switching element 2 by just the amount of current determined by the delay time tf(t) after current detection, the input voltage Vin, and a primary-side inductance $L_p$ of the transformer 1.

As described above, since the delay time tf(t) periodically and continuously varies within the time range from the first delay time to the second delay time, the current flowing through the switching element 2 periodically and continuously varies within a current range from a first current value to a second current value.

Meanwhile, in Formula (6) below,

[Formula 6]

$$I_o \times V_o = \frac{1}{2} \times L_p \times ILIMIT^2 \times f \quad (6)$$

if an output load current $I_o$ is constant, when a current ILIMIT flowing through the switching element 2 as described above varies, an oscillating frequency f of the switching element 2 also varies. For example, the oscillating frequency f decreases as ILIMIT increases, and the oscillating frequency f increases as ILIMIT decreases.

Therefore, when the current ILIMIT flowing through the switching element 2 due to the turn-off signal modulating circuit 22 periodically and continuously varies within a current range from a first current value to a second current value, the oscillating frequency f periodically and continuously varies, in association with the variation of the current ILIMIT, within a frequency range from a first oscillating frequency to a second oscillating frequency.

Figure 5:
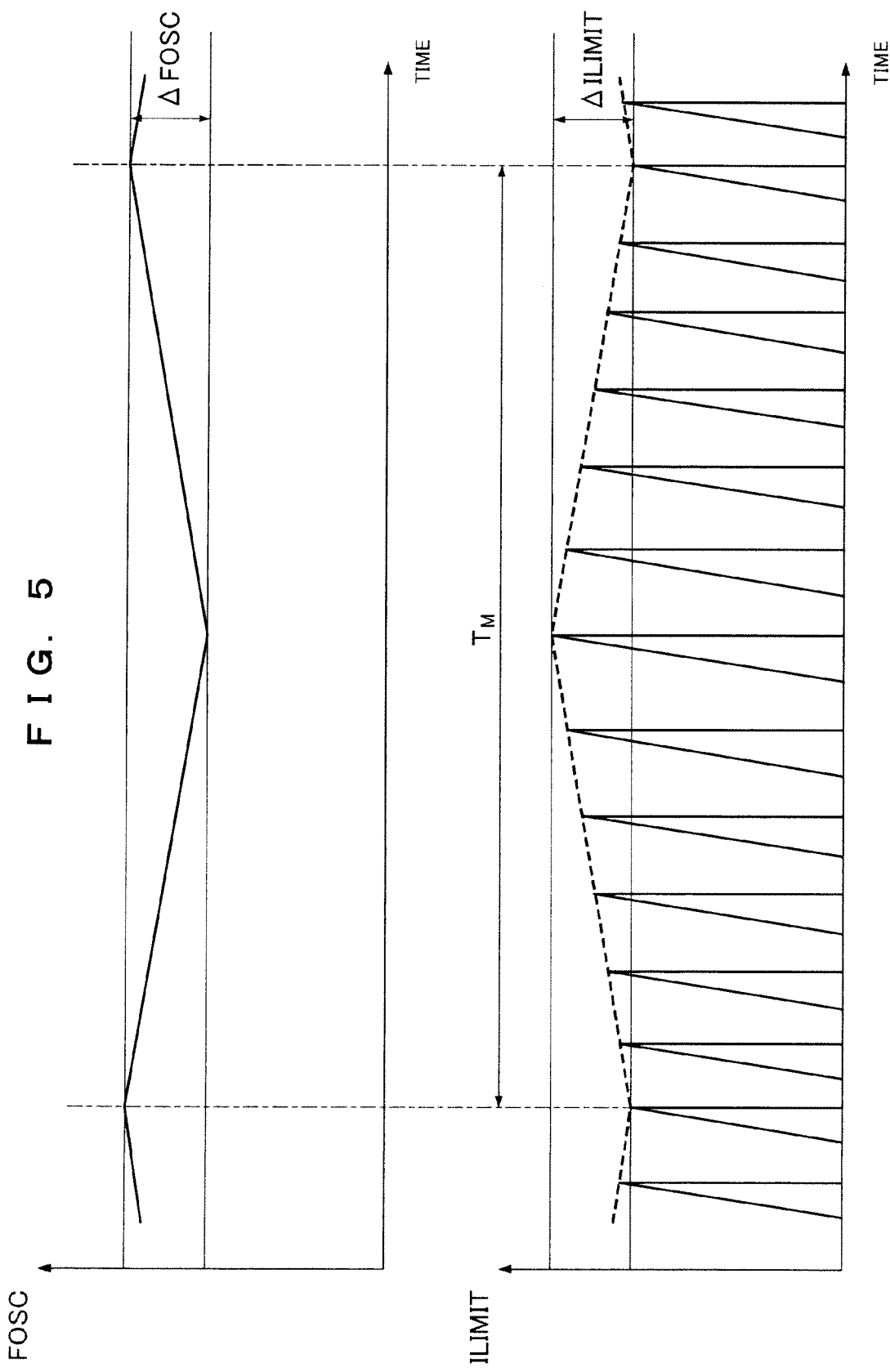
FIG. 5 is a timing chart for describing a variation in a current flowing through the switching element and an oscillating frequency at that point in the energy transfer device including the energy transfer control semiconductor device according to the first embodiment of the present invention.

In other words, by having the turn-off signal modulating circuit 22 modulate a timing at which the switching element 2 is turned off, the peak of a current flowing through the switching element 2 is modulated. As a result, even under a constant input voltage and a constant load, switching noise can be diffused while preventing concentration of the oscillating frequency at a constant frequency. FIG. 5 depicts this situation.

In this manner, the oscillating frequency can be modulated by modulating the peak of a current flowing through the switching element 2 to readily reduce an average value of a noise terminal voltage attributable to an outward leakage of a switching frequency of a switching power supply and harmonic components thereof from a commercial AC power supply-side in association with a switching operation.

A brief description of the low-frequency oscillator 50 inside the turn-off signal modulating circuit 22 will now be given based on FIG. 6 showing a circuit configuration example.

In FIG. 6, reference numerals 59, 60, and 61 denote constant current supplies, 67 a capacitor, 62, 63 and 70 P-type MOSFETs, 64 and 65 N-type MOSFETs, 66 an inverter circuit, 68 a resistor, and 69 a comparator. In addition, N-type MOSFETs 64 and 65 constitute mirror circuits.

In the comparator 69, a voltage Va at a negative-side point "a" is determined by the resistor 68 and the constant current supplies 60 and 61. If the resistor 68 has a resistance value of $R_0$, and the constant current supplies 60 and 61 respectively have current values of $I_1$ and $I_2$, then Va=$I_1 \times R_0$ when the P-type MOSFET 70 is turned off and Va=$(I_1+I_2) \times R_0$ when the P-type MOSFET 70 is turned on.

A description will now be given on operations of the low-frequency oscillator 50 configured as described above. When an output signal of the comparator 69 is at an L-level, the P-type MOSFETs 63 and 70 are in an ON state. In addition, since an H-level signal is inputted to a gate of the P-type MOSFET 62 via the inverter circuit 66, the P-type MOSFET 62 is in an OFF state.

At this point, a negative-side voltage Va of the comparator 69 is Va=$(I_1+I_2) \times R_0$. Furthermore, since the P-type MOSFET 63 is in an ON state, a constant current $I_0$ from the constant current supply 59 flows into the capacitor 67 via the P-type MOSFET 63. In association therewith, a voltage of a point b on the positive side of the comparator 69 rises. When a voltage Vb of the point b exceeds the voltage $(I_1+I_2) \times R_0$ of point "a", the output signal of the comparator 69 switches over to an H-level and, in association therewith, the P-type MOSFETs 63 and 70 enter an OFF state. At this point, the negative-side voltage Va of the comparator 69 switches to Va=$I_1 \times R_0$.

In addition, since an L-level signal is inputted to a gate of the P-type MOSFET 62 via the inverter circuit 66, the P-type MOSFET 62 is in an ON state. When the P-type MOSFET 62 switches to an ON state, the constant current $I_0$ from the constant current supply 59 flows into the N-type MOSFET 64 via the P-type MOSFET 62. Since the N-type MOSFETs 64 and 65 form mirror circuits, if the mirror ratio of the mirror circuits is, for example, 1, then a current flowing through the N-type MOSFET 65 is also $I_0$.

Therefore, an electrical charge stored in the capacitor 67 is drawn out from the constant current $I_0$ and, as a consequence, the voltage Vb at the point b drops. Once the voltage Vb at the point b drops to the voltage $I_1 \times R_0$ of the point "a", an output signal of the comparator 69 once again falls to an L-level. If the capacitance value of the capacitor 67 is denoted by $C_0$, then a time $T_M$ of a single period of the triangular wave voltage can be expressed as

[Formula 7]

$$T_M = 2 \times \frac{C_0 \times (I_2 \times R_0)}{I_0}. \tag{7}$$

By repeating the operations described above, an output triangular wave voltage from the low-frequency oscillator 50 continuously varies with a period $T_M$ within a voltage range ($I_2 \times R_0$) from a first voltage value ($I_1 \times R_0$) to a second voltage range (($I_1+I_2) \times R_0$).

As described above, by modulating an output triangular wave voltage Vf(t) from the low-frequency oscillator 50, a converted current If(t) by the V-I converter inside the feedback signal modulating circuit 22 is modulated, a delay time tf(t) after detection of a current of the switching element 2 is modulated in association therewith, and consequently, the peak ILIMIT of a current flowing through the switching element 2 is modulated. As a result, even when the input voltage Vin and the load current $I_o$ are both constant, switching noise can be diffused while preventing concentration of the oscillating frequency f at a constant frequency.

The period $T_M$ of the low-frequency oscillator 50 desirably ranges from several hundred Hz to several kHz.

Second Embodiment

Next, an energy transfer control semiconductor device according to a second embodiment of the present invention will be described.

Figure 7:
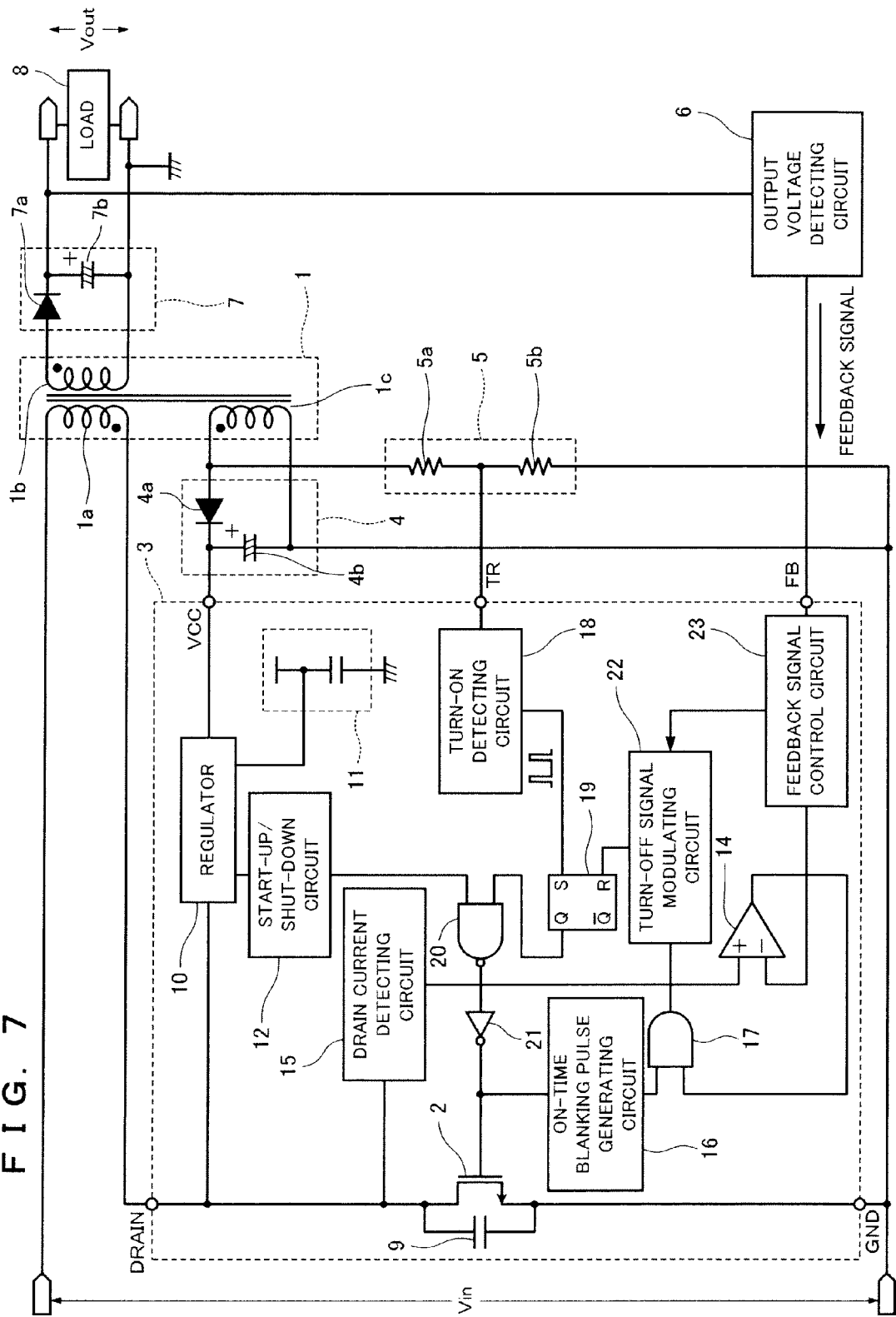
FIG. 7 is a circuit diagram showing a configuration example of an energy transfer device including an energy transfer control semiconductor device according to a second embodiment of the present invention.

FIG. 7 is a circuit diagram showing a configuration example of an energy transfer device including the energy transfer control semiconductor device according to the present second embodiment. In comparison with the first embodiment, in the present second embodiment, a signal is inputted from a feedback signal control circuit 23 to a turn-off signal modulating circuit 22. A primary object of the present second embodiment is to modulate a delay time tf(t) by the turn-off signal modulating circuit 22 in accordance with a feedback signal or, in other words, depending on a load condition of an output voltage Vout.

Since a description of operations is similar to the first embodiment described above, only modifications will be described hereafter. In addition, reference numerals are omitted for elements already described in the first embodiment.

Figure 8:
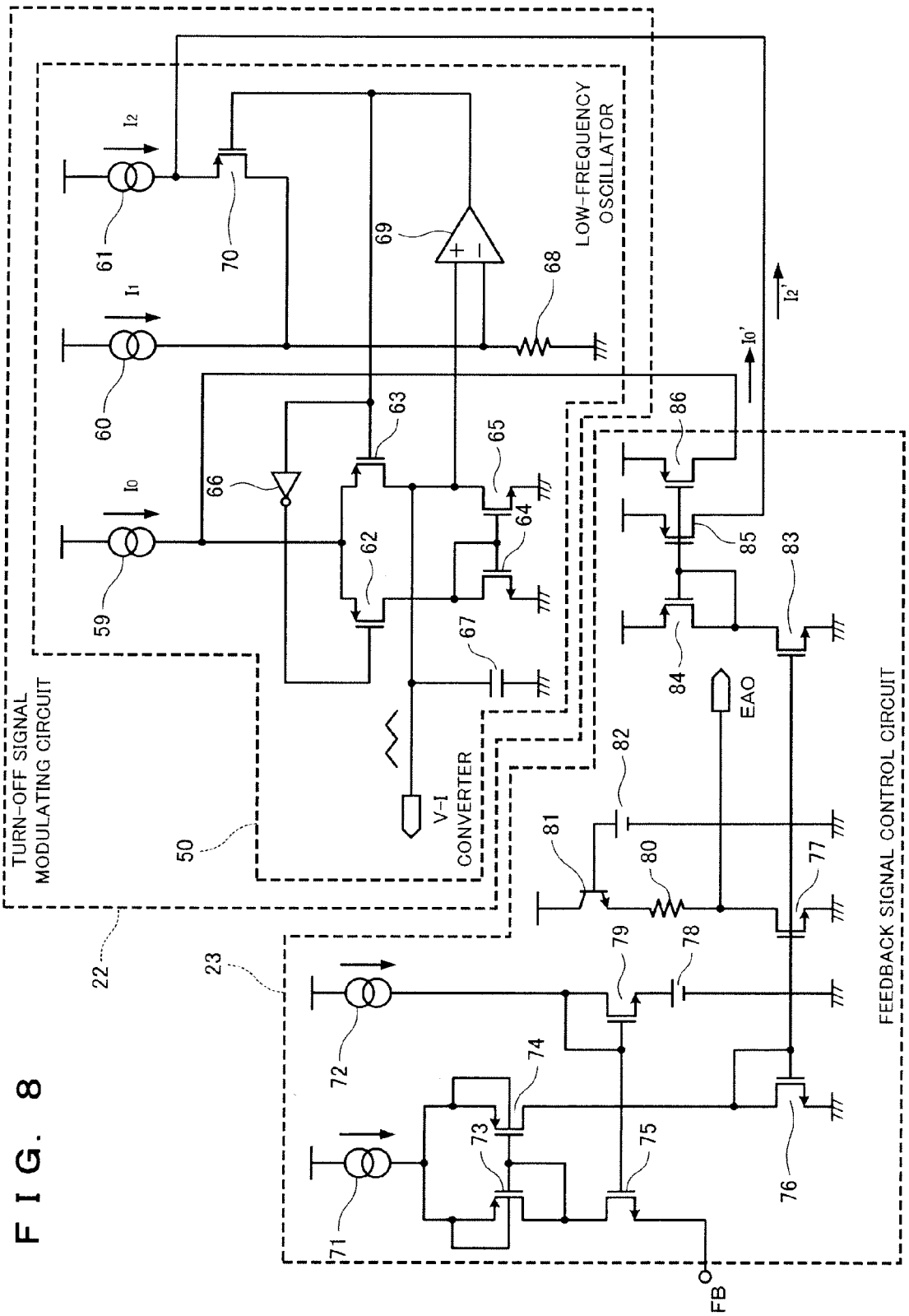
FIG. 8 is a circuit diagram showing a configuration example of a feedback signal control circuit, and a low-frequency oscillator inside a turn-off signal modulating circuit, in the energy transfer control semiconductor device according to the second embodiment of the present invention.

FIG. 8 is a circuit diagram showing a configuration example of the feedback signal control circuit 23, and a low-frequency oscillator 50 inside the turn-off signal modulating circuit 22, in the energy transfer control semiconductor device according to the present second embodiment. In comparison with FIG. 2, an N-type MOSFET 83 and P-type MOSFETs 84, 85, and 86 have been added to the feedback signal control circuit 23. The N-type MOSFET 83 is arranged as a mirror of an N-type MOSFET 76.

In addition, the P-type MOSFETs 85 and 86 are arranged as mirrors of the P-type MOSFET 84. A drain side of the P-type MOSFET 85 is connected to a source side of a P-type MOSFET 70, a drain side of the P-type MOSFET 86 is connected to source sides of P-type MOSFETs 62 and 63, and currents $I_0'$ and $I_2'$ respectively flow into the side of the low-frequency oscillator 50 from the P-type MOSFETs 86 and 85.

In such a configuration, since $I_0'$ and $I_2'$ vary in association with output load condition variations, an amplitude voltage of an output triangular wave of the low-frequency oscillator 50 may be expressed by

[Formula 8]

$$(I_2+I_2') \times R_0 \tag{8}.$$

Meanwhile, a period of an output triangular wave voltage may be expressed by

[Formula 9]

$$2 \times \frac{C_0 \times (I_2 \times R_0)}{I_0 + I_0'}. \tag{9}$$

When a load of the output voltage Vout is heavy, a feedback current flowing out from a FB terminal of the feedback signal control circuit 23 decreases. In association therewith, since a current flowing through the N-type MOSFET 83 that acts as a mirror of the N-type MOSFET 76 and a current flowing through the P-type MOSFET 84 decrease, currents $I_0'$ and $I_2'$ respectively flowing into the side of the low-frequency oscillator 50 from the P-type MOSFETs 86 and 85 also decrease.

Meanwhile, when the load of the output voltage Vout is light, a feedback current flowing out from the FB terminal of the feedback signal control circuit 23 increases. In association therewith, since a current flowing through the N-type MOSFET 83 that acts as a mirror of the N-type MOSFET 76 and a current flowing through the P-type MOSFET 84 increase, currents $I_0'$ and $I_2'$ respectively flowing into the side of the low-frequency oscillator 50 from the P-type MOSFETs 86 and 85 also increase.

According to Formula (8), the triangular wave amplitude voltage decreases when the load is heavy and the triangular wave amplitude voltage increases when the load is light. In other words, the smaller an output load current $I_o$, the greater the fluctuation range of the peak of a current flowing through the switching element 2. In association therewith, the fluctuation range of an oscillating frequency f increases.

Meanwhile, according to Formula (9), the triangular wave period becomes longer when the load is heavy and the triangular wave period becomes shorter when the load is light. In association therewith, the fluctuation period of the oscillating frequency f becomes shorter when the load is light. In other words, the smaller an output load current Io, the shorter the fluctuation period of the peak of a current flowing through the switching element 2.

With an RCC-type switching power supply, as is apparent from Formula (1), the greater the load current $I_o$ the lower the oscillating frequency f, and the smaller the load current $I_o$ the higher the oscillating frequency f. However, according to the configuration of the present second embodiment, as the oscillating frequency f increases when load is light, the fluctuation range of the oscillating frequency f increases while the fluctuation period of the oscillating frequency f decreases.

Figure 9:
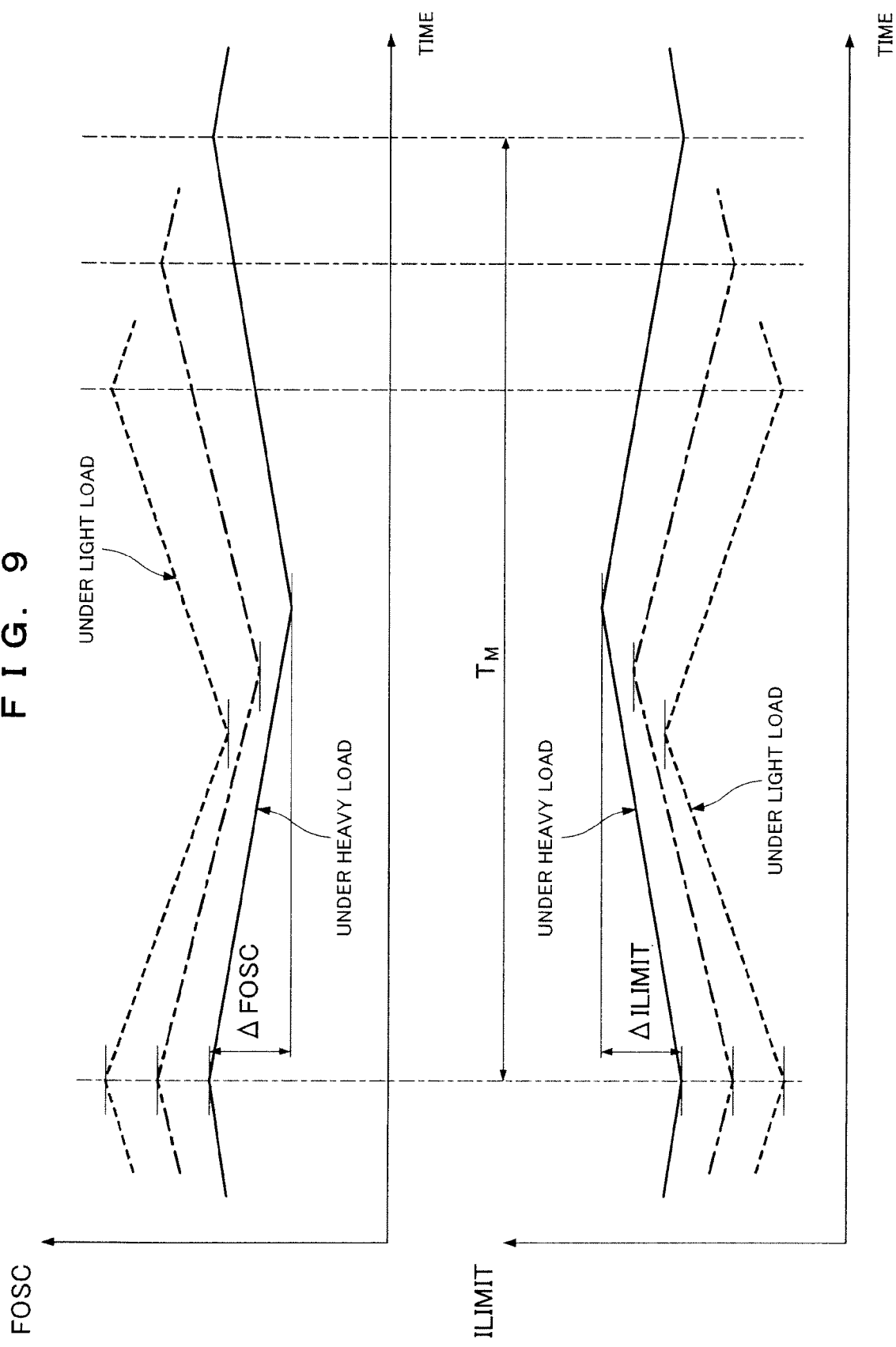
FIG. 9 is a timing chart for describing a variation in a current flowing through a switching element and an oscillating frequency at that point in the energy transfer device including the energy transfer control semiconductor device according to the second embodiment of the present invention.

FIG. 9 represents the variations in the peak value of a current flowing through the switching element 2 and in the oscillating frequency with respect to the output load current $I_o$.

As described above, by modulating the peak value of the current flowing through the switching element 2 in association with the fluctuation in the output load current $I_o$, it is now possible to control the oscillating frequency fluctuation range and the oscillating frequency fluctuation period with respect to the oscillating frequency f of the switching element 2 so as to be approximately constant across the entire load range. Therefore, the effect of reducing an average value of a noise terminal voltage can be significant.

Third Embodiment

Next, an energy transfer control semiconductor device according to a third embodiment of the present invention will be described.

Figure 10:
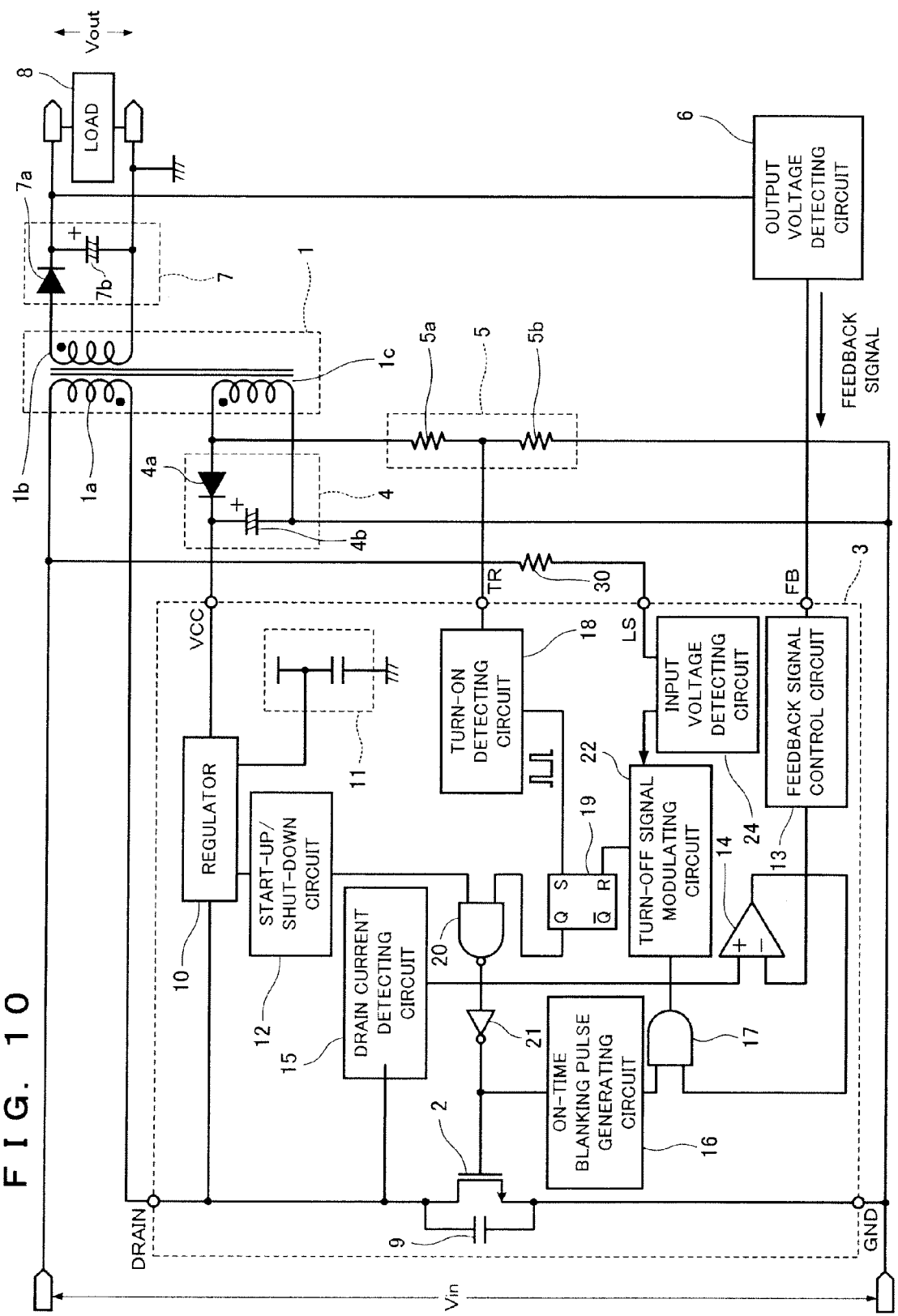
FIG. 10 is a circuit diagram showing a configuration example of an energy transfer device including an energy transfer control semiconductor device according to a third embodiment of the present invention.

FIG. 10 is a circuit diagram showing a configuration example of an energy transfer device including the energy transfer control semiconductor device according to the present third embodiment. In comparison with the first embodiment, in the present third embodiment, a control circuit 3 has been provided with an LS terminal and a resistor 30 is inserted between an input voltage Vin and the LS terminal.

In addition, a current inputted to the LS terminal from the input Vin via the resistor 30 is to be inputted to an input voltage detecting circuit 24 and a signal in accordance with the current value is to be inputted to a turn-off signal modulating circuit 22, and a primary object of the present third embodiment is to modulate a delay time tf(t) by the turn-off signal modulating circuit 22 in accordance with the magnitude of the input voltage Vin.

Since a description of operations is similar to the first embodiment described above, only modifications will be described hereafter. In addition, reference numerals are omitted for elements already described in the first embodiment.

Figure 11:
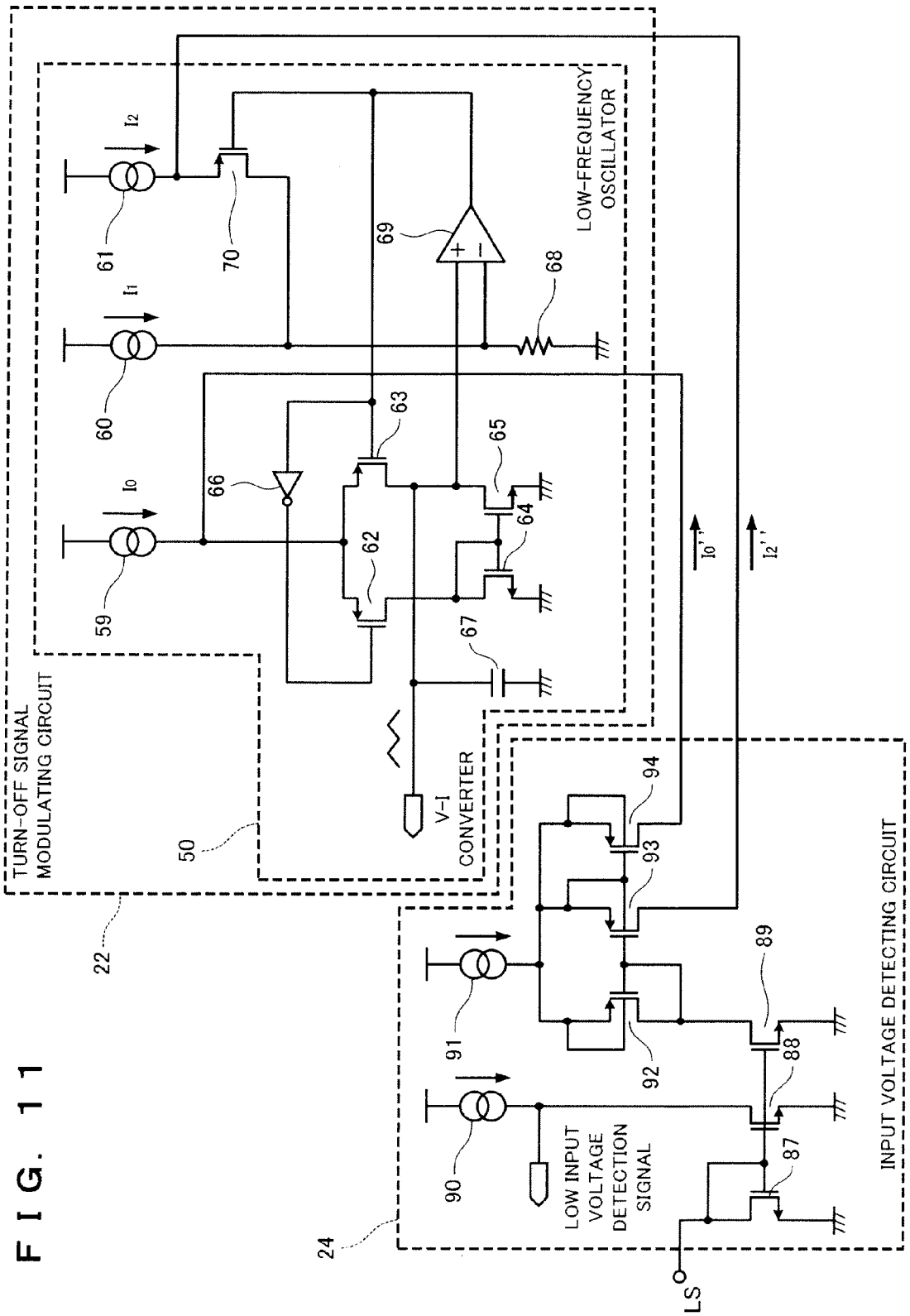
FIG. 11 is a circuit diagram showing a configuration example of an input voltage detecting circuit, and a low-frequency oscillator inside a turn-off signal modulating circuit, in the energy transfer control semiconductor device according to the third embodiment of the present invention.

FIG. 11 is a circuit diagram showing a configuration example of the input voltage detecting circuit 24, and a low-frequency oscillator 50 inside the turn-off signal modulating circuit 22, in the energy transfer control semiconductor device according to the present third embodiment.

The input voltage detecting circuit 24 includes N-type MOSFETs 87, 88, and 89 which constitute mirror circuits, constant current supplies 90 and 91, and P-type MOSFETs 92, 93, and 94 which constitute mirror circuits. A drain side of the P-type MOSFET 93 is connected to a source side of the P-type MOSFET 70, a drain side of the P-type MOSFET 94 is connected to source sides of P-type MOSFETs 62 and 63, and currents $I_0"$ and $I_2"$ respectively flow into the side of the low-frequency oscillator 50 from the P-type MOSFETs 94 and 93.

In addition, the constant current supply 91 is provided for current limiting in order to prevent the aforementioned currents $I_0"$ and $I_2"$ which flow into the side of the low-frequency oscillator 50 from becoming excessively large and to prevent control from becoming unstable when a current inputted to the LS terminal is large in the event that an overvoltage is inputted due to a surge or the like to the input voltage Vin.

Furthermore, the constant current supply 90 is provided for performing low input voltage detection of the input voltage Vin and is arranged so as to output an L-level signal as a low input voltage detection signal when a current flowing through the N-type MOSFET 88 exceeds a constant current value of the constant current supply 90.

In such a configuration, since $I_0"$ and $I_2"$ vary in association with a current injected to the LS terminal depending on the input voltage Vin, an amplitude voltage of an output triangular wave of the low-frequency oscillator 50 may be expressed by

[Formula 10]

$$(I_2+I_2") \times R_0 \qquad (10).$$

Meanwhile, a period of an output triangular wave voltage may be expressed by

[Formula 11]

$$2 \times \frac{C_0 \times (I_2 \times R_0)}{I_0 + I_0"}. \qquad (11)$$

If a threshold voltage of the N-type MOSFET 87 is denoted by Vt(LS) and the resistor 30 by $R_1$, then a current $I_{LS}$ flowing into the LS terminal may be expressed as

[Formula 12]

$$I_{LS} = \frac{Vin - Vt(LS)}{R_1}. \qquad (12)$$

Consequently, since the current flowing into the LS terminal is small when the input voltage Vin is low, and in association therewith, a current flowing through the N-type MOSFET 89 that acts as a mirror of the N-type MOSFET 87 and a current flowing through the P-type MOSFET 92 are small, currents $I_0"$ and $I_2"$ respectively flowing into the side of the low-frequency oscillator 50 from the P-type MOSFETs 94 and 93 are also small.

On the other hand, when the input voltage Vin is high, since the current flowing into the LS terminal is large, and in association therewith, since the current flowing through the N-type MOSFET 89 that acts as a mirror of the N-type MOSFET 87 and the current flowing through the P-type MOSFET 92 increase, currents $I_0"$ and $I_2"$ respectively flowing into the side of the low-frequency oscillator 50 from the P-type MOSFETs 94 and 93 also increase.

According to Formula (10), the triangular wave amplitude voltage decreases when the input voltage is low and the triangular wave amplitude voltage increases when the input voltage is high. In other words, the higher the input voltage Vin, the greater the fluctuation range of the peak of the current flowing through the switching element 2. In association therewith, the fluctuation range of an oscillating frequency f increases.

Meanwhile, according to Formula (11), the triangular wave period becomes longer when the input voltage is low and the triangular wave period becomes shorter when the input voltage is high. In association therewith, the fluctuation period of the oscillating frequency f becomes shorter when the input voltage is high. In other words, the higher the input voltage Vin, the shorter the fluctuation period of the peak value of the current flowing through the switching element 2.

With an RCC-type switching power supply, as is apparent from Formula (1), the lower the input voltage Vin the lower the oscillating frequency f, and the higher the input voltage Vin the higher the oscillating frequency f. However, according to the configuration of the present third embodiment, as the input voltage Vin increases, the fluctuation range of the oscillating frequency f increases while the fluctuation period of the oscillating frequency f decreases.

As described above, by modulating the peak value of a current flowing through the switching element 2 in association with the fluctuation in the input voltage Vin, it is now possible to control the oscillating frequency fluctuation range and the oscillating frequency fluctuation period with respect to the oscillating frequency f of the switching element 2 so as to be approximately constant within a wide input voltage range. Therefore, the effect of reducing an average value of a noise terminal voltage can be significant.

Moreover, the second and third embodiments may be combined.

Fourth Embodiment

Next, an energy transfer control semiconductor device according to a fourth embodiment of the present invention will be described.

Figure 12:
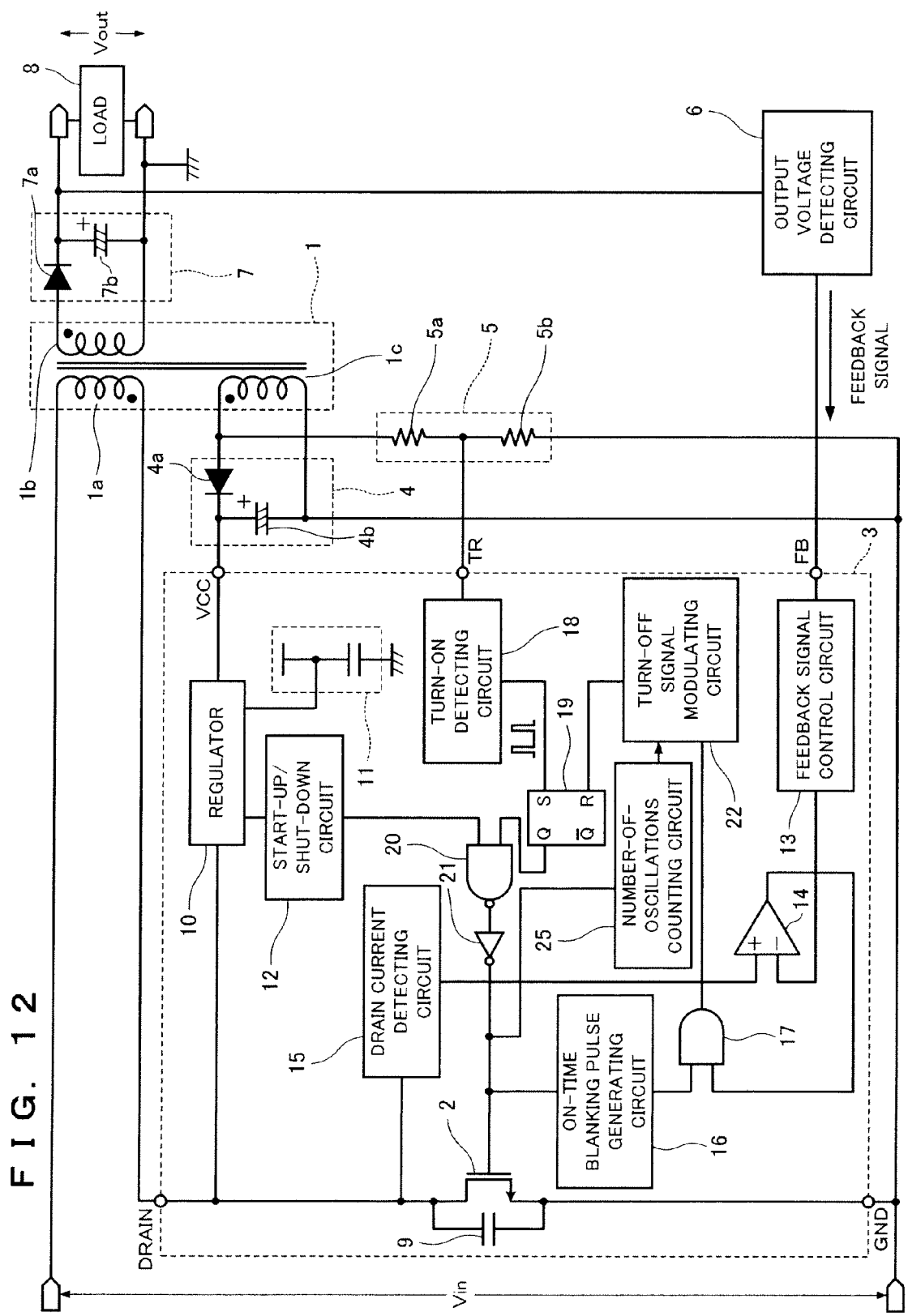
FIG. 12 is a circuit diagram showing a configuration example of an energy transfer device including an energy transfer control semiconductor device according to a fourth embodiment of the present invention.

FIG. 12 is a circuit diagram showing a configuration example of an energy transfer device including the energy transfer control semiconductor device according to the present fourth embodiment. In comparison with the first embodiment, the present fourth embodiment includes a number-of-oscillations counting circuit 25, and a primary object of the present fourth embodiment is to modulate a delay time tf(t) by a turn-off signal modulating circuit 22 in accordance with the number of oscillations of a switching element 2.

Since a description of operations is similar to the first embodiment described above, only modifications will be described hereafter. In addition, reference numerals are omitted for elements already described in the first embodiment.

Figure 13:
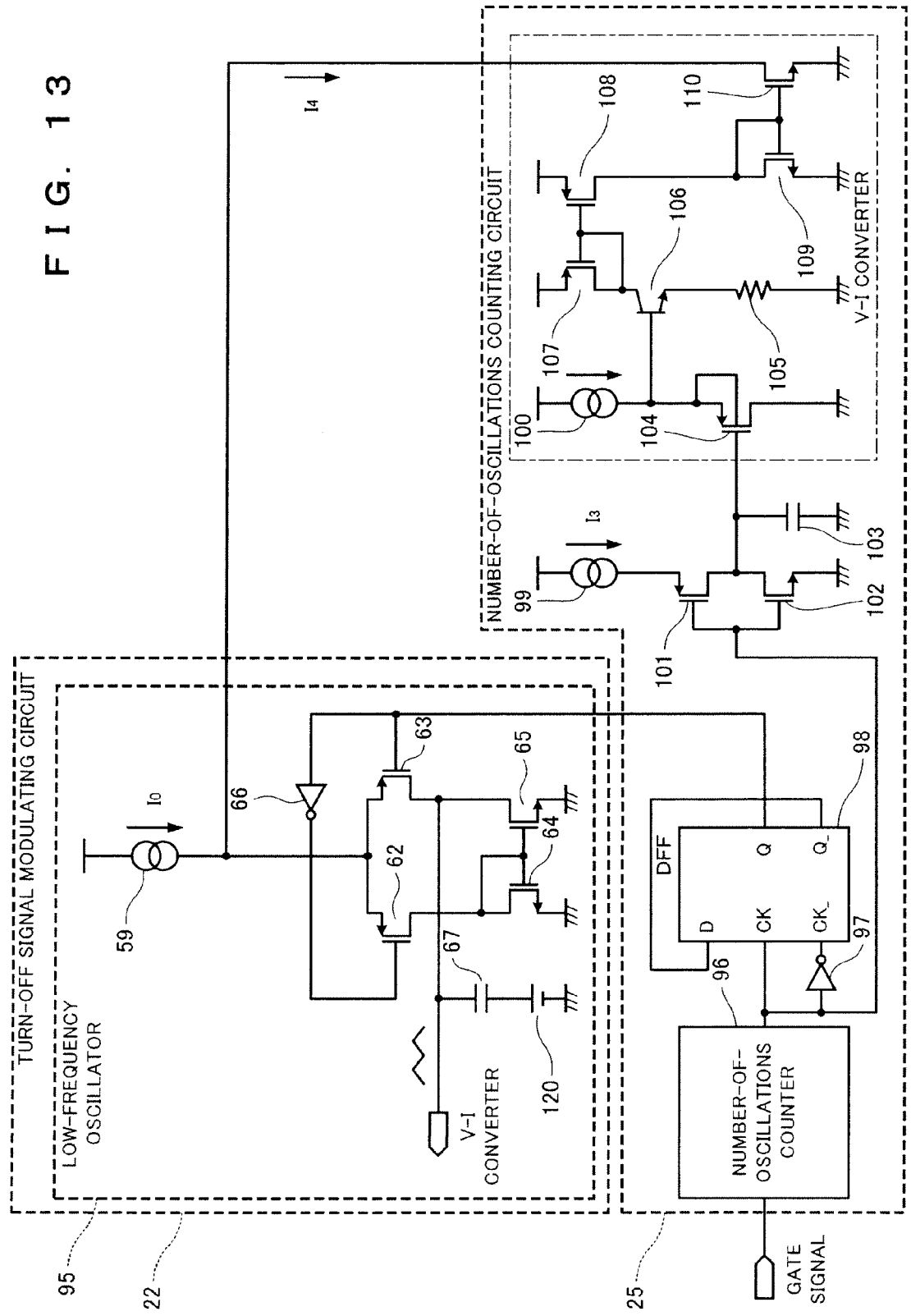
FIG. 13 is a circuit diagram showing a configuration example of a number-of-oscillations counting circuit, and a low-frequency oscillator inside a turn-off signal modulating circuit, in the energy transfer control semiconductor device according to the fourth embodiment of the present invention.

FIG. 13 is a circuit diagram showing a configuration example of the number-of-oscillations counting circuit 25, and a low-frequency oscillator 95 inside the turn-off signal modulating circuit 22, in the energy transfer control semiconductor device according to the present fourth embodiment. Although the low-frequency oscillator 95 differs from the low-frequency oscillator shown in FIG. 6, since the low-frequency oscillator 95 constitutes a part of the circuit configuration, reference numerals of shared portions have been omitted.

Figure 4:
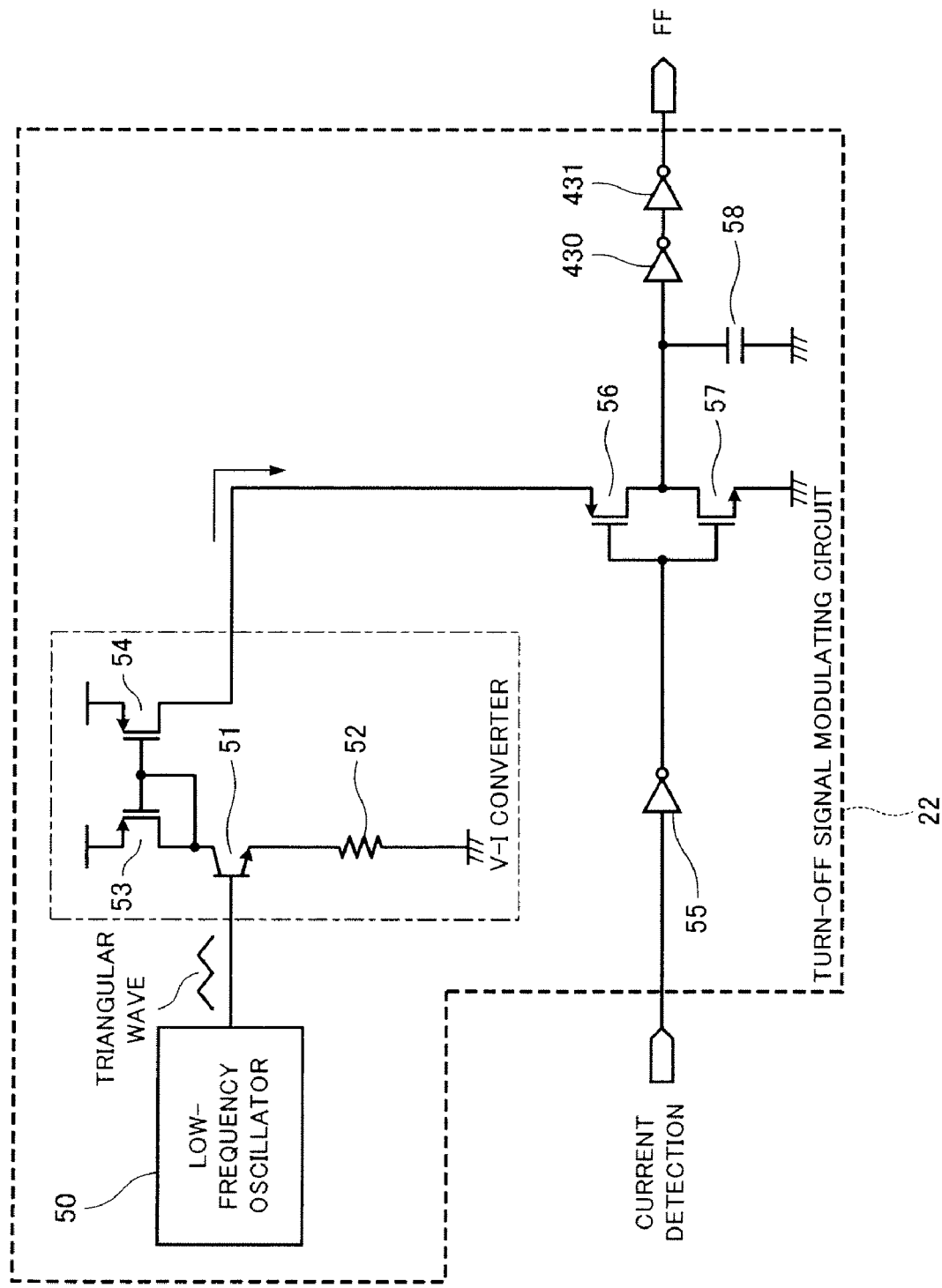
FIG. 4 is a circuit diagram showing a configuration example of a turn-off signal modulating circuit in the energy transfer control semiconductor device according to the first embodiment of the present invention.

Reference numeral 120 of the low-frequency oscillator 95 denotes a constant voltage supply that is set so that an NPN bipolar transistor 51 constituting the V-I converter shown in FIG. 4 is operational even when no electrical charge is stored in a capacitor 67 of the low-frequency oscillator 95.

In the number-of-oscillations counting circuit 25, a number-of-oscillations counter 96 monitors an output signal of the gate driver 21 shown in FIG. 12 as a gate signal, counts the number of turn-ons (turn-offs shall also suffice), and when a predetermined number of turn-ons (or turn-offs) is reached, outputs an H-level signal to a DFF 98 until a next gate signal is counted. In addition, an output inverted signal (Q_) of the DFF 98 is connected to data (D), and an output (Q) is inputted to an inverter circuit 66 and a P-type MOSFET 63 of the low-frequency oscillator 95.

Meanwhile, an output signal of the number-of-oscillations counter 96 is inputted to an inverter circuit constituted by a P-type MOSFET 101 and an N-type MOSFET 102. A constant current supply 99 is connected to a source of the P-type MOSFET 101.

A V-I converter is constituted by a constant current supply 100, a P-type MOSFET 104, an NPN bipolar transistor 106, a resistor 105, P-type MOSFETs 107 and 108, and N-type MOSFETs 109 and 110. If a gate voltage of the P-type MOSFET 104 is denoted by $V_{gP}(t)$, a threshold voltage of the P-type MOSFET 104 determined by a constant current value of the constant current supply 100 by Vtp, Vbe of the NPN bipolar transistor 106 by $Vbe_1$, a resistance value of the resistor 105 by $R_2$, and if a mirror circuit constituted by the P-type MOSFETs 107 and 108 and a mirror circuit constituted by the N-type MOSFETs 109 and 110 have a mirror ratio of 1, then a current value $I_4$ may be expressed by the following formula.

[Formula 13]

$$I_4 = \frac{V_{gP}(t) + Vtp - Vbe_1}{R_2} \quad (13)$$

The constant current $I_4$ is connected to the low-frequency oscillator 95. A constant current $I_0$ of a constant current supply 59 is drawn out by just the constant current value $I_4$ determined by Formula (13) presented above, and the remaining current of the constant current $I_0$ flows into the P-type MOSFET 62 or 63.

Assuming now that the number of oscillations has reached a predetermined number of oscillations, the output signal of the number-of-oscillations counter 96 has been switched from an L-level to an H-level, and in association therewith, the output signal (Q) of the DFF 98 has been switched from an H-level to an L-level, the N-type MOSFET 102 enters an ON state. Therefore, the N-type MOSFET 102 emits an electrical charge stored in a capacitor 103 when the P-type MOSFET 101 is in an ON state and a gate voltage of the P-type MOSFET 104 becomes a GND level.

Meanwhile, since the P-type MOSFET 63 of the low-frequency oscillator 95 enters an ON state, the current $I_4$ calculated as $V_{gP}(t)=0$ in Formula (13) is drawn out from the constant current $I_0$ of the constant current supply 59 of the low-frequency oscillator 95 and the remaining current $I_0-I_4$ flows into the capacitor 67 via the P-type MOSFET 63.

As the next oscillation is counted, the output of the number-of-oscillations counter 96 is switched to an L-level, causing the P-type MOSFET 101 to enter an ON state. Consequently, since a constant current value $I_3$ of the constant current supply 99 flows into the capacitor 103, a gate voltage of the P-type MOSFET 104 rises. If a capacitance value of the capacitor 103 is denoted by $C_1$, then the gate voltage $V_{gP}(t)$ of the P-type MOSFET 104 rises with time according to the following formula.

[Formula 14]

$$V_{gP}(t) = \frac{I_3}{C_1} \times t \quad (14)$$

Accordingly, the current $I_4$ expressed by Formula (13) is drawn out with time from the constant current $I_0$ of the constant current supply 59, and the remaining current $I_0-I_4$ flows into the capacitor 67 via the P-type MOSFET 63 and the potential of the capacitor 67 rises with time.

Subsequently, as the predetermined number of oscillations is reached, the output of the number-of-oscillations counter 96 once again reaches an H-level, and in association therewith, the output (Q) of the DFF 98 switches to an H-level. Although operations of $I_4$ are the same as presented earlier and therefore will not be described, since the output (Q) of the DFF 98 has changed to the H-level, the P-type MOSFET 63 enters an OFF state while the P-type MOSFET 62 enters an ON state. Therefore, the current $I_0$-$I_4$ is to be drawn out from the capacitor 67 through the N-type MOSFET 65.

Figure 14:
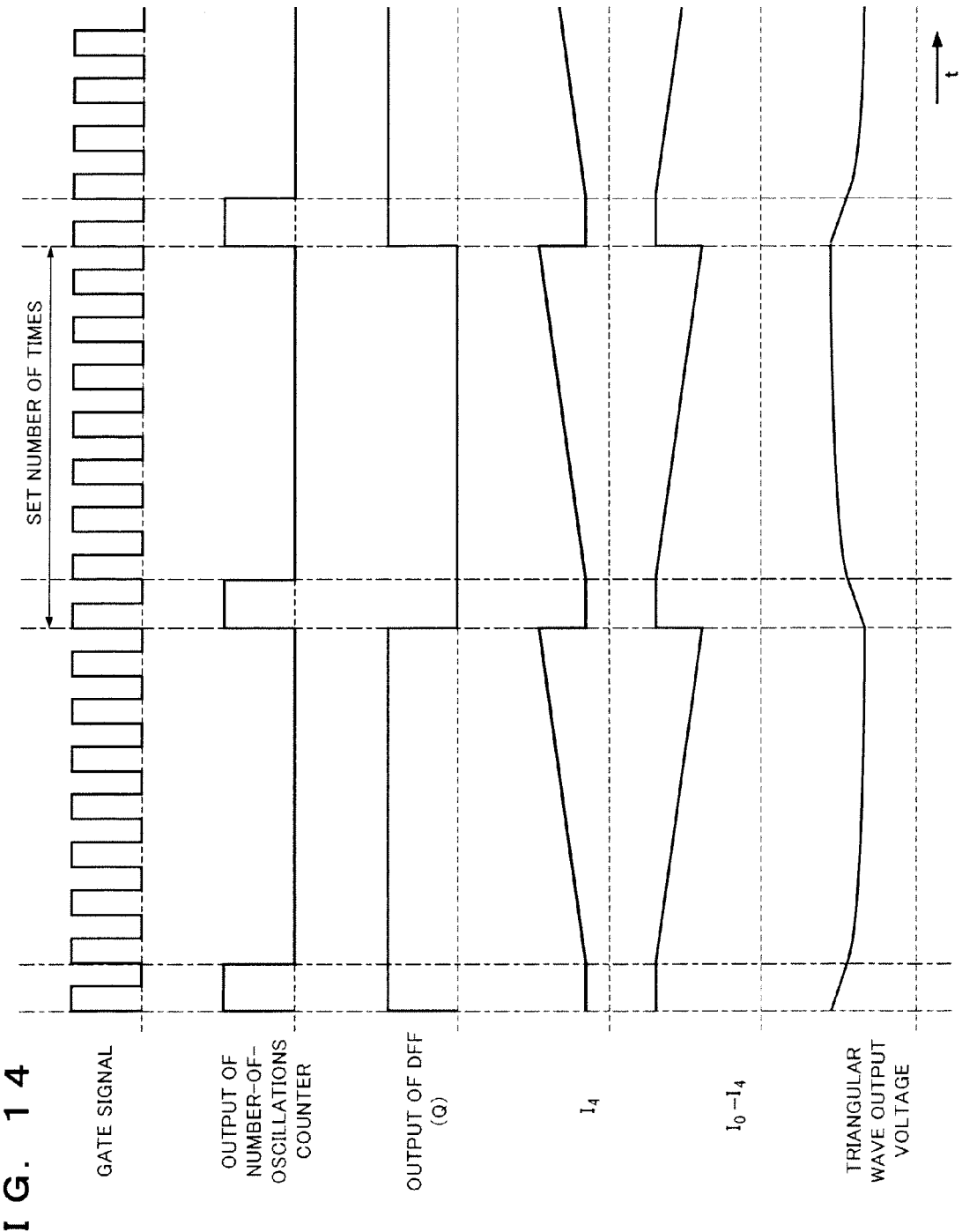
FIG. 14 is a timing chart showing operations performed by the number-of-oscillations counting circuit in the energy transfer control semiconductor device according to the fourth embodiment of the present invention.

Through the operations described above, by charging and discharging the capacitor 67 with the current $I_0$-$I_4$ in accordance with the number of oscillations of the switching element 2, an output triangular wave voltage from the low-frequency oscillator 95 is generated. FIG. 14 depicts this situation.

According to the configuration of the present fourth embodiment, since the triangular wave output voltage of the low-frequency oscillator 95 can be determined depending on the number of oscillations, the switchover period of triangular waves becomes faster when the switching frequency is high, such as in a low-load condition or when input voltage is high, and the switchover period becomes slower when the switching frequency is low, such as in a high-load condition or when input voltage is constant.

Moreover, with the present configuration, the amplitude of the output triangular wave voltage of the low-frequency oscillator 95 with respect to an oscillating frequency becomes slightly smaller when the oscillating frequency is higher. However, by adopting an alternate configuration, the amplitude can be arranged to increase as the oscillating frequency becomes higher, which can be considered more effective in terms of reducing an average value of a noise terminal voltage.

As described above, by modulating the peak value of a current flowing through the switching element 2 by modulating the amplitude and period of an output triangular wave voltage from the low-frequency oscillator 95 depending on the number of oscillations of the switching element 2, it is now possible to modulate the oscillating frequency regardless of an input voltage or an output load condition. Therefore, the effect of reducing an average value of a noise terminal voltage can be significant.

Fifth Embodiment

Next, an energy transfer control semiconductor device according to a fifth embodiment of the present invention will be described.

Figure 15:
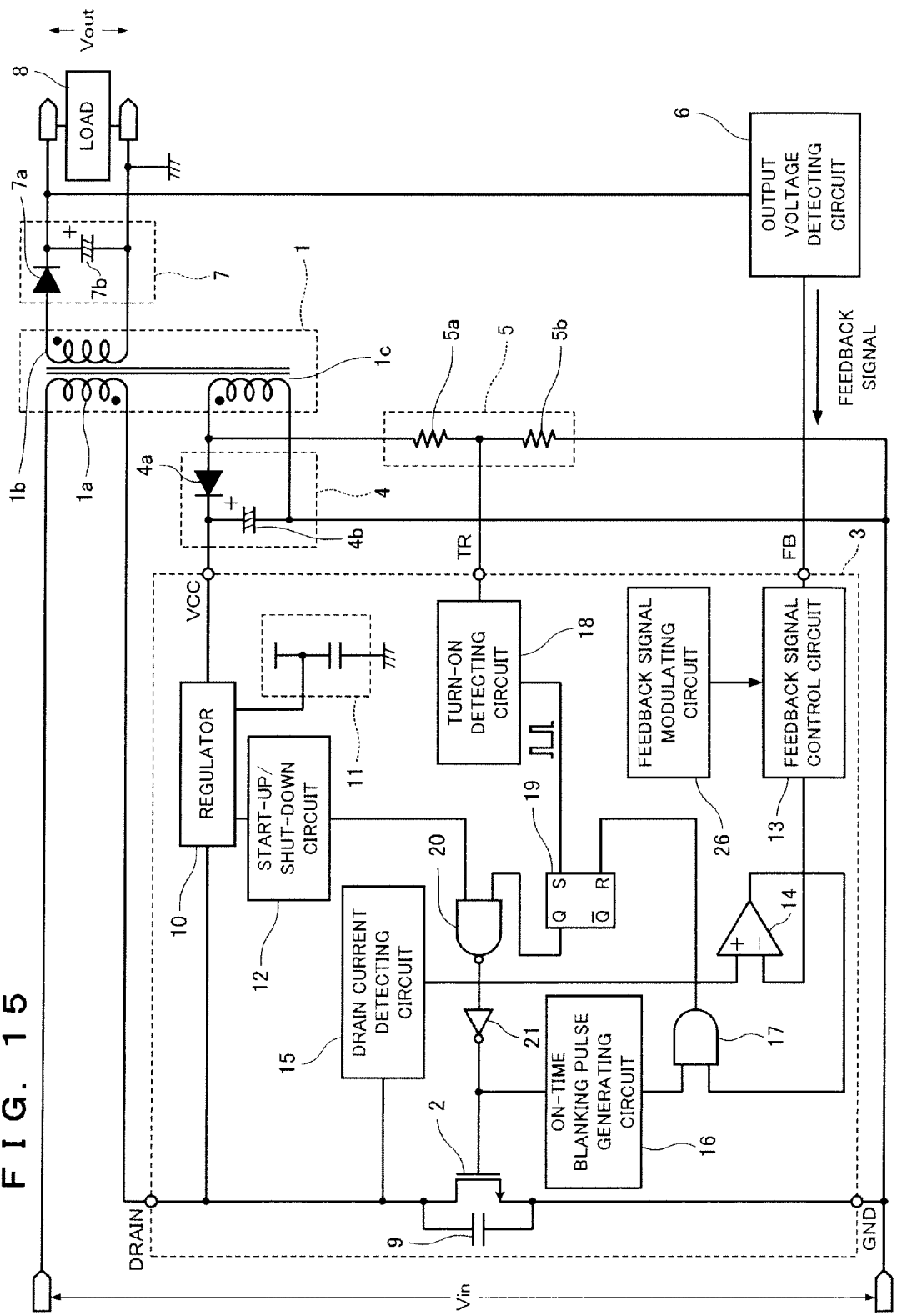
FIG. 15 is a circuit diagram showing a configuration example of an energy transfer device including an energy transfer control semiconductor device according to a fifth embodiment of the present invention.

FIG. 15 is a circuit diagram showing a configuration example of an energy transfer device including the energy transfer control semiconductor device according to the present fifth embodiment. In the present fifth embodiment, in comparison with the first embodiment, a feedback signal modulating circuit 26 is disposed in place of a turn-off signal modulating circuit 22.

In the first embodiment, after detecting a current of the switching element 2, a delay time until the moment when an off signal is actually transferred to a gate of the switching element 2 was set, and the delay time was modulated by the turn-off signal modulating circuit 22 to modulate the peak value of the current of the switching element 2.

In addition, as already described with reference to FIGS. 2 and 3, a level of the current to flow through the switching element 2 is determined by a feedback signal control circuit 13 based on the magnitude of a feedback current flowing out from an FB terminal of the control circuit 3.

Therefore, as another means for modulating the peak of a current of the switching element 2, modulation can conceivably be applied to current control of the switching element 2 by the feedback signal control circuit 13.

The present fifth embodiment is provided with the feedback signal modulating circuit 26 for modulating a signal of the feedback signal control circuit 13, and a primary object of the present fifth embodiment is to modulate the peak value of a current of the switching element 2 in order to modulate an oscillating frequency of the switching element 2. Since a description of operations is similar to the first embodiment described above, only modifications will be described hereafter.

Figure 16:
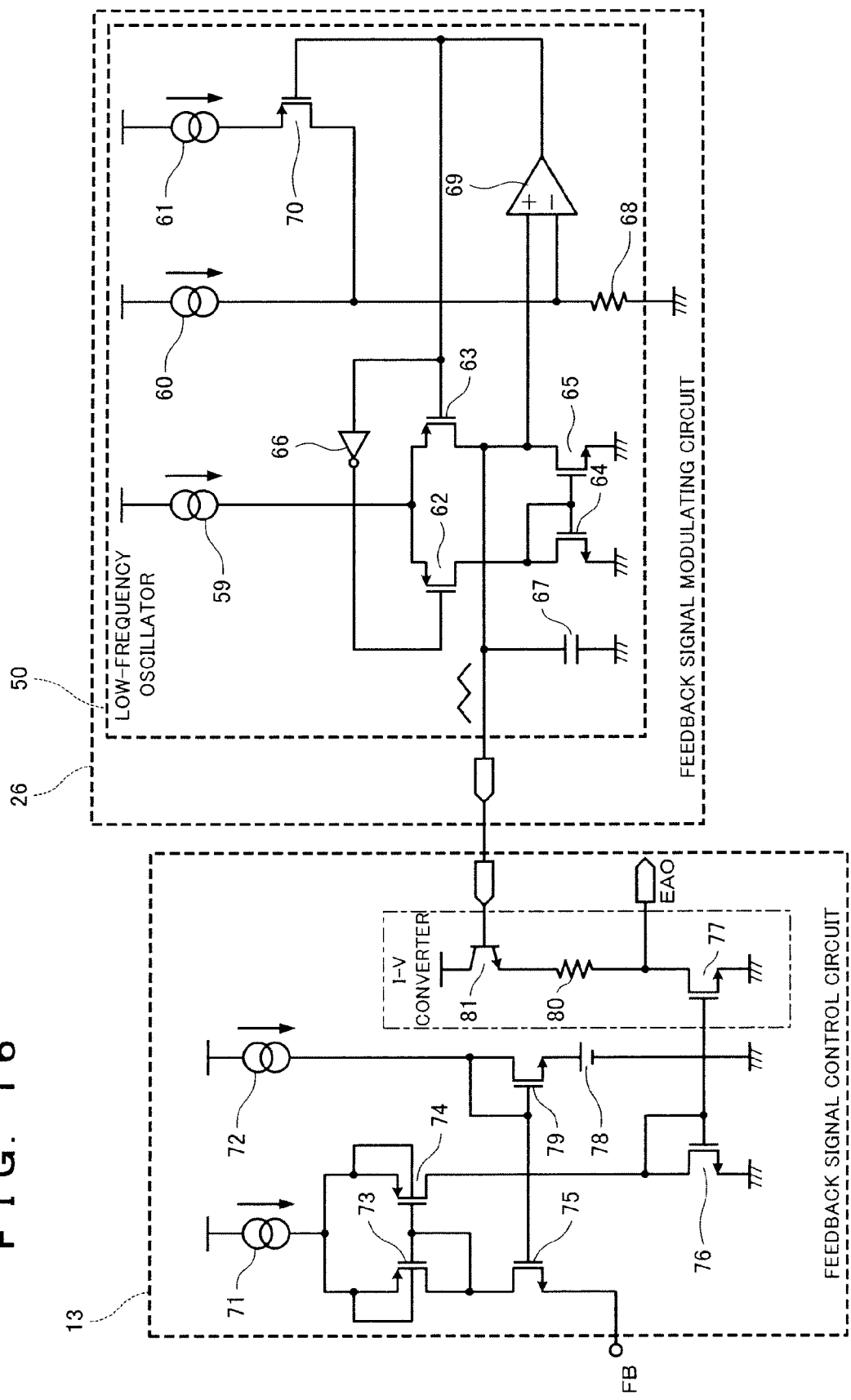
FIG. 16 is a circuit diagram showing a configuration example of a feedback signal control circuit, and a low-frequency oscillator inside a feedback signal modulating circuit, in the energy transfer control semiconductor device according to the fifth embodiment of the present invention.

FIG. 16 is a circuit diagram showing a configuration example of the feedback signal control circuit 13 and the feedback signal modulating circuit 26 in the energy transfer control semiconductor device according to the present fifth embodiment of the present invention. In FIG. 16, the feedback signal modulating circuit 26 has a similar configuration as the low-frequency oscillator 50 shown in FIG. 6. In addition, in comparison to FIG. 2, an output triangular wave voltage of the feedback signal modulating circuit 26, i.e., the low-frequency oscillator 50, instead of a constant voltage supply 82 is inputted to a base of an NPN bipolar transistor 81 of the feedback signal control circuit 13.

Although a description on operations of the low-frequency oscillator 50 will be omitted here, a converted voltage VEAO by an I-V converter inside the feedback signal control circuit 13 may be expressed using a triangular wave voltage Vf(t) instead of a constant voltage VR of a constant voltage supply represented in Formula (3) as

[Formula 15]

$$VEAO = Vf(t) - Vbe - (R \times I) \quad (15).$$

In this case, even if an input voltage and a load current are constant and a current flowing out of an FB terminal, i.e., reference character I in Formula (15), is constant, since an output Vf(t) from the feedback signal modulating circuit 26 which becomes a reference voltage of the I-V converter periodically and continuously varies within a voltage range from a first voltage value to a second voltage value, reference character VEAO that is a converted output voltage of the I-V converter periodically and continuously varies within the voltage range from the first voltage value to the second voltage value.

Consequently, even if the input voltage and the load current are constant, since the peak value of a current of the switching element 2 is modulated so as to periodically and continuously vary within a current range from a first current value to a second current value, switching noise can be diffused while preventing concentration of the oscillating frequency at a constant frequency.

In addition, with the aforementioned means, the reference voltage of the I-V converter inside the feedback signal control circuit 13 and the peak value of a current of the switching element 2 are modulated by a triangular wave voltage outputted by the feedback signal modulating circuit 26. However, the output voltage VEAO of the I-V converter can also be modulated by modulating a current of the I-V converter.

Figure 17:
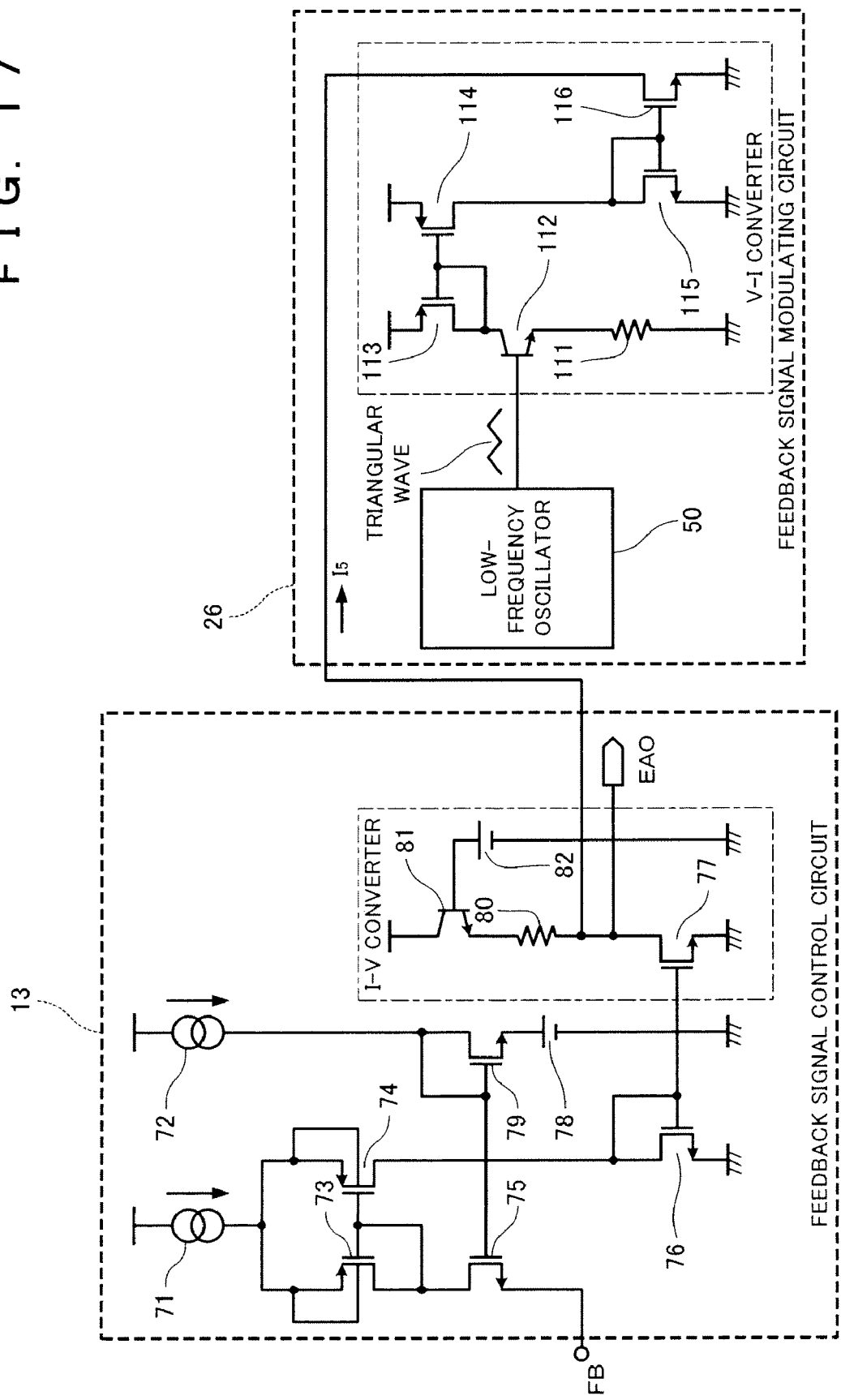
FIG. 17 is a circuit diagram showing a configuration example of another feedback signal control circuit and a feedback signal modulating circuit in the energy transfer control semiconductor device according to the fifth embodiment of the present invention.

FIG. 17 is a circuit diagram showing a configuration example of the feedback signal control circuit 13 and the feedback signal modulating circuit 26 in the case where a current of the I-V converter inside the feedback signal control circuit 13 is modulated.

The feedback signal modulating circuit 26 is constituted by the low-frequency oscillator 50, and a V-I converter including a resistor 111, an NPN bipolar transistor 112, P-type MOSFETs 113 and 114, and N-type MOSFETs 115 and 116. Although a description on operations will be omitted since the operations are the same as the previous operations, if an output current by the V-I converter inside the feedback signal modulating circuit 26 is denoted by $I_5(t)$, from Formula (3), an output voltage VEAO of the I-V converter inside the feedback signal control circuit 13 may then be expressed as

[Formula 16]

$$VEAO = VR - Vbe - (R \times I_5(t)) \tag{16}$$

Since $I_5(t)$ is determined by a triangular wave output voltage Vf(t) of the low-frequency oscillator 50 inside the feedback signal modulating circuit 26, $I_5(t)$ periodically and continuously varies within a current range from a first current value to a second current value. In association therewith, even if the input voltage and the load current are constant, since the output voltage VEAO of the I-V converter inside the feedback signal control circuit 13 periodically and continuously varies within a voltage range from a first voltage value to a second voltage value, the peak of a current of the switching element 2 is modulated by VEAO.

Consequently, it is possible to reduce an average value of a noise terminal voltage without having the oscillating frequency concentrate at a constant frequency.

Moreover, by combining the present fifth embodiment with the second embodiment and modulating the output voltage VEAO of the feedback signal control circuit 13 depending on an output load current, modulation can be performed at an amplitude and a period of an oscillating frequency at the same rate as the oscillating frequency of the switching element 2. Therefore, the effect of reducing an average value of a noise terminal voltage can be significant across the entire load range.

Furthermore, in the same manner, by combining the present fifth embodiment with the third embodiment and modulating the output voltage VEAO of the feedback signal control circuit 13 depending on the magnitude of an input voltage Vin, modulation can be performed at an amplitude and a period of an oscillating frequency at the same rate as the oscillating frequency of the switching element 2. Therefore, the effect of reducing an average value of a noise terminal voltage can be significant across the entire load range.

In addition, it is also possible to combine the present fifth embodiment with the fourth embodiment and modulate the output voltage VEAO of the feedback signal control circuit 13 depending on the number of oscillations of the switching element 2.

Moreover, in the respective embodiments described above, although the switching element 2 and the control circuit 3 are disposed on the same substrate, the switching element 2 and the control circuit 3 need not necessarily be disposed on the same substrate.

In addition, although configurations are provided in which a current is drawn out from the FB terminal as a feedback signal from the output voltage detecting circuit 6, control may be performed by injecting a current into the FB terminal.

Furthermore, although the low-frequency oscillator 50 includes a built-in resistor for determining a triangular wave amplitude voltage, a terminal may be provided in the control circuit 3 to adjust the resistor from the outside. Furthermore, a terminal that determines a period can be similarly provided and a capacitor can be connected to the outside.

What is claimed is:

1. An energy transfer device comprising:
   a transformer having a primary winding, a secondary winding, and an auxiliary winding;
   a switching element series-connected to the primary winding;
   a control circuit that controls a switching operation of the switching element to perform switching control on a first DC voltage to be inputted to the switching element via the primary winding;
   an output voltage generating unit that converts an AC voltage generated on the secondary winding by the switching control into a second DC voltage and supplies power to a load; and
   an output voltage detecting circuit that detects a variation in the second DC voltage and transfers a feedback signal for the switching control generated in accordance with the variation to the control circuit, wherein
   the control circuit includes:
   a feedback signal control circuit that determines a level of a current flowing through the switching element based on the feedback signal from the output voltage detecting circuit;
   a switching element current detecting circuit that generates a signal that turns off the switching element when the current flowing through the switching element reaches the level value determined by the feedback signal control circuit;
   a turn-on detecting circuit that detects, from a voltage of the auxiliary winding, a state of a ringing voltage generated after a secondary current flowing through the secondary winding ceases to flow after the switching element is turned off, and generates a signal for turning on the switching element; and
   a current peak modulator that performs modulation so that a peak of the current flowing through the switching element periodically and continuously varies within a current range from a first current value to a second current value.

2. The energy transfer device according to claim 1, wherein a turn-off signal modulating circuit that performs modulation so that a turn-off signal of the switching element by the switching element current detecting circuit periodically and continuously varies within a time range from a first delay time to a second delay time is provided as the current peak modulator to the control circuit; and
   time modulation is performed by the turn-off signal modulating circuit in order to vary a turn-off timing of the switching element and modulate the current peak.

3. The energy transfer device according to claim 2, wherein the turn-off signal modulating circuit includes:
   a low-frequency oscillator that outputs a triangular wave voltage; and
   a V-I converter that converts the triangular wave voltage from the low-frequency oscillator into a current,
   the time modulation is determined depending on a magnitude of an output current of the V-I converter, and
   a modulation time of the turn-off signal is set based on an amplitude of the triangular wave voltage to the time range from the first delay time to the second delay time while a modulation period is determined depending on a switchover period of the triangular wave voltage.

4. The energy transfer device according to claim 2, wherein the turn-off signal modulating circuit automatically varies a modulation duration and a modulation period of the turn-off signal according to an output signal from the feedback signal control circuit based on a feedback signal from the output voltage detecting circuit.

5. The energy transfer device according to claim 4, wherein the turn-off signal modulating circuit increases the modulation duration and shortens the modulation period as a load condition of the second DC current becomes a lighter load condition according to an output signal from the feedback signal control circuit based on a feedback signal that varies depending on the load condition of the second DC voltage.

6. The energy transfer device according to claim 2, wherein an input voltage detecting circuit that detects the first DC voltage is provided to the control circuit, and
the turn-off signal modulating circuit automatically varies a modulation duration and a modulation period of the turn-off signal according to an output signal from the input voltage detecting circuit.

7. The energy transfer device according to claim 6, wherein the turn-off signal modulating circuit increases the modulation duration and shortens the modulation period as the first DC voltage increases according to an output signal from the input voltage detecting circuit which varies depending on the first DC voltage.

8. The energy transfer device according to claim 6, wherein the turn-off signal modulating circuit causes an operation for automatically varying the modulation duration and the modulation period to be performed when the first DC voltage equals or exceeds a preset constant voltage.

9. The energy transfer device according to claim 2, wherein a number-of-oscillations counting circuit that counts the number of oscillations due to the switching operation of the switching element is provided to the control circuit; and
the turn-off signal modulating circuit automatically varies a modulation duration and a modulation period of the turn-off signal according to an output signal from the number-of-oscillations counting circuit.

10. The energy transfer device according to claim 9, wherein
the number-of-oscillations counting circuit includes:
a number-of-oscillations counter that inputs a control electrode signal of the switching element and outputs a high level at a timing when the number of switching operations of the switching element reaches a preset count; and
a D flip-flop that switches an output signal between a low level and a high level at the timing when the preset count is reached, and
the turn-off signal modulating circuit automatically varies the modulation duration and the modulation period according to an output signal from the D flip-flop.

11. The energy transfer device according to claim 10, wherein
the turn-off signal modulating circuit increases the modulation duration and shortens the modulation period as the number-of-oscillations count time quickens according to an output signal from the D flip-flop which is outputted at the timing when the preset count is reached.

12. The energy transfer device according to claim 1, wherein
a feedback signal modulating circuit that modulates an output signal from the feedback signal control circuit which determines the level of a current flowing through the switching element is provided as the current peak modulator to the control circuit, and
the feedback signal control circuit modulates the peak of a current flowing through the switching element so as to periodically and continuously vary within the current range from the first current value to the second current value according to an output signal modulated by the feedback signal modulating circuit.

13. The energy transfer device according to claim 12, wherein
the feedback signal control circuit includes an I-V converter that converts a feedback current into a voltage as a feedback signal from the output voltage detecting circuit, and
a reference voltage of the I-V converter is periodically and continuously varied within a voltage range from a first voltage value to a second voltage value according to an output voltage from the feedback signal modulating circuit in order to modulate the peak of a current flowing through the switching element so as to periodically and continuously vary within the current range from the first current value to the second current value.

14. The energy transfer device according to claim 13, wherein
the feedback signal modulating circuit includes a low-frequency oscillator that outputs a triangular wave, and
the feedback signal control circuit determines the voltage range from the first voltage value to the second voltage value according to an amplitude of a triangular wave voltage from the low-frequency oscillator as the reference voltage of the I-V converter and determines a modulation period according to a switchover period of the triangular wave.

15. The energy transfer device according to claim 14, wherein
the feedback signal control circuit modulates the peak of a current flowing through the switching element so as to periodically and continuously vary within the current range from the first current value to the second current value by periodically and continuously varying an output voltage from the I-V converter within the voltage range from the first voltage value to the second voltage value using the reference voltage of the I-V converter having the voltage range from the first voltage value to the second voltage value determined according to the amplitude of the triangular wave voltage from the low-frequency oscillator and the modulation period.

16. The energy transfer device according to claim 12, wherein
the feedback signal modulating circuit includes:
a low-frequency oscillator that outputs a triangular wave; and
a V-I converter that converts a triangular wave voltage from the low-frequency oscillator into a current,
the feedback signal control circuit includes
an I-V converter that converts a feedback current into a voltage as a feedback signal from the output voltage detecting circuit, and
the energy transfer device determines, via the V-I converter, a current range from a first current value to a second current value according to an amplitude of a triangular wave voltage from the low-frequency oscillator as an input current to the I-V converter, determines a modulation period in accordance with a switchover period of the triangular wave voltage, and by periodically and continuously varying the input current to the I-V converter within a current range from a first current value to a second current value according to an output current from the V-I converter, modulates the peak of a current flowing through the switching element so as to periodically and continuously vary within the current range from the first current value to the second current value.

17. The energy transfer device according to claim 12, wherein
the feedback signal control circuit automatically varies a modulation duration and a modulation period of a turn-off signal with respect to the peak of a current flowing through the switching element by controlling a feedback signal from the output voltage detecting circuit using an output signal from the feedback signal modulating circuit.

18. The energy transfer device according to claim 17, wherein
the feedback signal modulating circuit automatically varies the modulation duration and the modulation period with respect to an output signal to the feedback signal control circuit depending on a load condition of the second DC voltage to increase the modulation duration and shorten the modulation period as the load condition becomes on a lighter load condition.

19. The energy transfer device according to claim 12, wherein
an input voltage detecting circuit that detects a magnitude of the first DC voltage is provided to the control circuit,
the feedback signal control circuit automatically varies a modulation duration and a modulation period of a turn-off signal with respect to the peak of a current flowing through the switching element by controlling a feedback signal from the output voltage detecting circuit using an output signal from the feedback signal modulating circuit, and
the feedback signal modulating circuit automatically varies the modulation duration and the modulation period of the output signal to the feedback signal control circuit depending on an output signal from the input voltage detecting circuit.

20. The energy transfer device according to claim 19, wherein
the feedback signal modulating circuit automatically varies the modulation duration and the modulation period of an output signal to the feedback signal control circuit depending on a magnitude of the first DC voltage to increase the modulation duration and shorten the modulation period as the first DC voltage increases.

21. The energy transfer device according to claim 19, wherein
the feedback signal modulating circuit automatically varies the modulation duration and the modulation period of an output signal to the feedback signal control circuit depending on a magnitude of the first DC voltage to perform an operation for automatically varying the modulation duration and the modulation period when the first DC voltage equals or exceeds a preset constant voltage.

22. The energy transfer device according to claim 12, wherein
a number-of-oscillations counting circuit that counts the number of oscillations due to the switching operation of the switching element is provided to the control circuit,
the feedback signal control circuit automatically varies a modulation duration and a modulation period of a turn-off signal with respect to the peak of a current flowing through the switching element by controlling a feedback signal from the output voltage detecting circuit using an output signal from the feedback signal modulating circuit, and
the feedback signal modulating circuit automatically varies the modulation duration and the modulation period of the output signal to the feedback signal control circuit depending on an output signal from the number-of-oscillations counting circuit.

23. The energy transfer device according to claim 22, wherein
the number-of-oscillations counting circuit includes:
a number-of-oscillations counter that counts the number of oscillations of the switching element based on a control electrode signal of the switching element and outputs a high level at a timing when the number of oscillations of the switching element reaches a preset count; and
a D flip-flop that switches an output signal between a low level and a high level at a timing when the output of the number-of-oscillations counter reaches a high level, and
the feedback signal modulating circuit automatically varies the modulation duration and the modulation period of an output signal to the feedback signal control circuit depending on an output signal of the D flip-flop.

24. The energy transfer device according to claim 23, wherein
the feedback signal modulating circuit automatically varies the modulation duration and the modulation period of an output signal to the feedback signal control circuit depending on a switchover time between a low level and a high level of an output signal from the D flip-flop, and increases the modulation duration and shortens the modulation period as the switchover time between the low level and the high level of the output signal from the D flip-flop quickens.

25. An energy transfer control semiconductor device, wherein
the switching element and the control circuit are formed as an integrated circuit on a same semiconductor substrate in the energy transfer device according to claim 1.

* * * * *